United States Patent
Zang et al.

(10) Patent No.: US 7,068,712 B1
(45) Date of Patent: Jun. 27, 2006

(54) CABLE NETWORK REDUNDANCY ARCHITECTURE

(75) Inventors: Joanna Qun Zang, San Jose, CA (US); Feisal Daruwalla, Santa Clara, CA (US); James R. Forster, Los Altos, CA (US); Guenter E. Roeck, San Jose, CA (US); Joseph O'Donnell, Fremont, CA (US); John Chen, Fremont, CA (US); Mark Millet, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/484,612

(22) Filed: Jan. 18, 2000

(51) Int. Cl.
*H04B 1/38* (2006.01)

(52) U.S. Cl. .................................................. 375/222
(58) Field of Classification Search ................ 375/222, 375/219, 220, 356, 354, 257, 221; 370/214, 370/220, 324; 725/111
See application file for complete search history.

(56) References Cited

U.S. PATENT DOCUMENTS

| | | | |
|---|---|---|---|
| 5,515,429 A * | 5/1996 | Kawada et al. ............. 379/279 |
| 5,835,696 A | 11/1998 | Hess |
| 5,949,753 A | 9/1999 | Alexander, Jr. et al. |
| 5,982,745 A | 11/1999 | Wolff et al. |
| 5,999,536 A | 12/1999 | Kawafuji et al. |
| 6,111,675 A * | 8/2000 | Mao et al. ...................... 398/7 |
| 6,157,965 A | 12/2000 | Mohammed |
| 6,189,102 B1 | 2/2001 | Beser |
| 6,230,326 B1 * | 5/2001 | Unger et al. ................. 725/111 |
| 6,236,678 B1 * | 5/2001 | Horton et al. ............... 375/222 |
| 6,298,063 B1 | 10/2001 | Coile |
| 6,301,223 B1 * | 10/2001 | Hrastar et al. ............... 370/227 |
| 6,370,147 B1 * | 4/2002 | Beser ........................... 370/401 |
| 6,389,027 B1 | 5/2002 | Lee et al. |
| 6,449,249 B1 | 9/2002 | Cloonan et al. |
| 6,449,250 B1 * | 9/2002 | Otani et al. .................. 370/219 |
| 6,480,469 B1 * | 11/2002 | Moore et al. ................ 370/241 |
| 6,487,605 B1 * | 11/2002 | Leung .......................... 709/245 |
| 6,510,162 B1 * | 1/2003 | Fijolek et al. ............... 370/432 |
| 6,553,568 B1 * | 4/2003 | Fijolek et al. ............... 725/111 |
| 6,556,591 B1 * | 4/2003 | Bernath et al. .............. 370/509 |
| 6,588,016 B1 * | 7/2003 | Chen et al. .................. 725/111 |
| 6,606,352 B1 * | 8/2003 | Horton et al. ............... 375/222 |
| 6,611,868 B1 * | 8/2003 | Arutyunov ................... 709/227 |
| 6,636,971 B1 * | 10/2003 | Loukianov ................... 713/189 |
| 6,650,624 B1 * | 11/2003 | Quigley et al. .............. 370/252 |
| 6,650,641 B1 | 11/2003 | Albert |
| 6,760,316 B1 * | 7/2004 | Hebsgaard et al. .......... 370/324 |

* cited by examiner

*Primary Examiner*—Emmanuel Bayard
(74) *Attorney, Agent, or Firm*—Beyer, Weaver & Thomas, LLP.

(57) ABSTRACT

A CMTS redundancy technique requires at least two CMTS interfaces (e.g., line cards) on one or more CMTS chassis at the head end of a cable network. One of the CMTSs serves as a backup or "protecting" CMTS. When another CMTS (a "working" CMTS) becomes unavailable to service its group of cable modems, the protecting CMTS takes over service to those cable modems. The SWITCHOVER takes place transparently (or nearly transparently) to the cable modems. The protecting CMTS provides service on the same downstream channel as used by the working CMTS. The cable modems need not modify any settings pursuant to their cable modem communication protocol (e.g., DOCSIS ranging). This transparency to the cable modems is realized by keeping the working and protecting CMTSs in synchronization regarding service parameters for the cable modems. In other words, the protecting CMTS maintains a list of current parameters for allowing service to the cable modems.

59 Claims, 16 Drawing Sheets

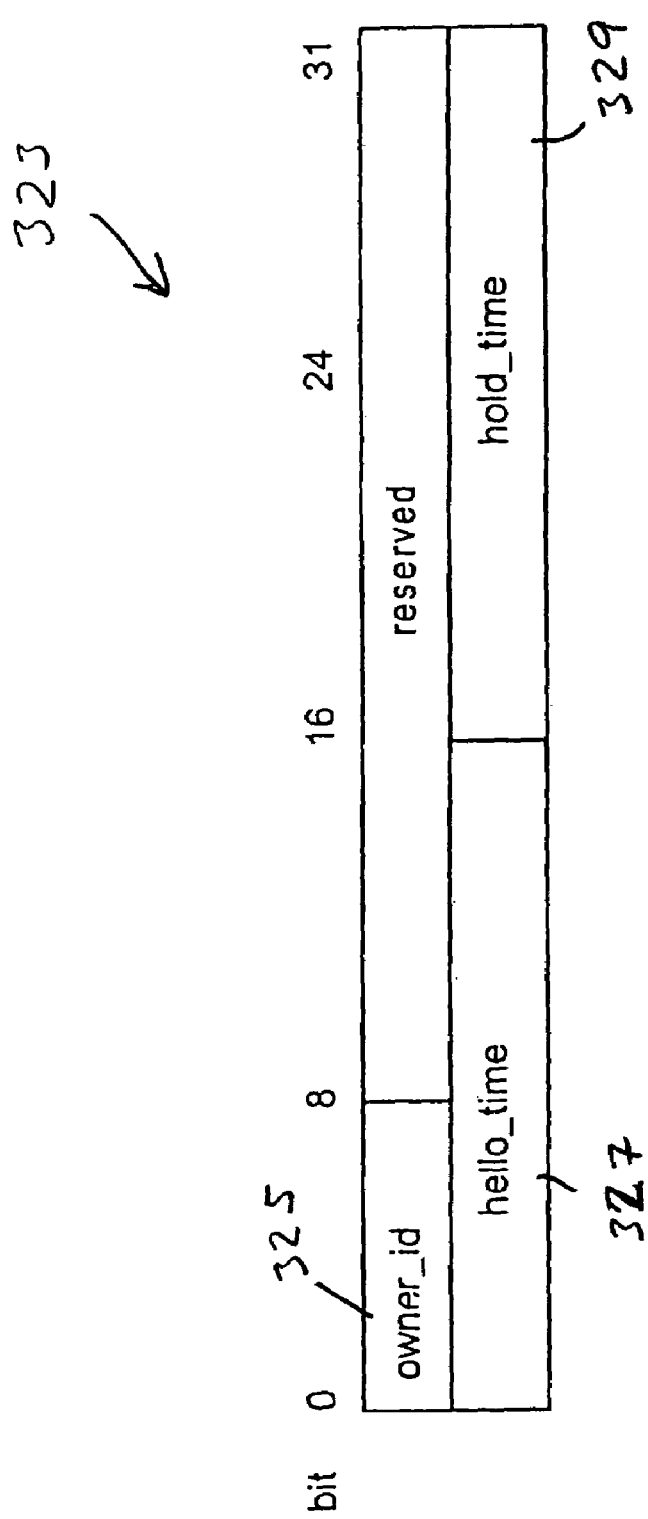

| Value Message | Name Message | Description |
|---|---|---|
| 1 | LOCKOUT | Teaching wCMTS tells pCMTS that it is not switchable. |
| 2 | UNLOCKOUT | Teaching wCMTS tells pCMTS that it is switchable. |
| 3 | RESYNC | Teaching wCMTS tells pCMTS that it is performing resync its entire database. |
| 4 | REG CM | Registration. Contains DOCSIS REG_REQ TLVs. |
| 5 | UCD | Upstream channel description. Contains DOCSIS UCD TLVs. |
| 6 | RNG | CM Ranging. Contains DOCSIS RNG_RSP TLVs. |
| 7 | DSA | CM Dynamic service add. Contains DOCSIS DSA_REQ TLVs. |
| 8 | DSD | CM Dynamic service delete. Contains DOCSIS DSD_REQ TLVs. |
| 9 | DSC | CM Dynamic service change. Contains DOCSIS DSC_REQ TLVs. |
| 10 | BPKM | CM Baseline privacy key management. Contains DOCSIS(8) TLVs. |
| 11 | SNA | Subnet add. Contains the MAC and IP address and IP mask for the sub-interface of CM and CPE to be added: 6 bytes MAC address, 4 bytes IP address, 4 bytes IP mask. |
| 12 | SND | Subnet delete. Contains the MAC and IP address and IP mask for the sub-interface of CM and CPE to be deleted: 6 bytes MAC address, 4 bytes IP address, 4 bytes IP mask. |
| 13 | SYNC | Time synchronization. Contains DOCSIS SYNC Timestamp. |
| 14 | ~255 | Reserved for future use. |

Figure 4

| State | wCMTS | Behavior |
|---|---|---|
| w_init | hccp->active = NULL;<br>hccp->standbylist: 0 element; | transition state during initialization. |
| w_standalone | hccp->active != NULL;<br>hccp->standbylist: 0 element; | forwarding traffic; |
| w_teach | hccp->active != NULL;<br>hccp->standbylist: 0 element; | forwarding traffic;<br>receive HELLO;<br>send HELLO_ACK;<br>send SYNC;<br>receive SYNC_ACK; |
| w_learn | hccp->active = NULL;<br>hccp->standbylist: 1 element; | receive HELLO;<br>send HELLO_ACK;<br>receive SYNC;<br>send SYNC_ACK; |

Figure 5A

| State | pCMTS | Behavior |
|---|---|---|
| p_init | hccp->active = NULL;<br>hccp->standbylist: 0 element; | transition state during initialization. |
| p_standalone | hccp->active != NULL;<br>hccp->standbylist: n-1 elements; | forwarding traffic;<br>send HELLO;<br>receive HELLO_ACK;<br>receive SYNC;<br>send SYNC_ACK; |
| p_teach | hccp->active != NULL;<br>hccp->standbylist: n-1 elements; | forwarding traffic;<br>send HELLO;<br>receive HELLO_ACK;<br>receive SYNC;<br>send SYNC_ACK;<br>send SYNC;<br>receive SYNC_ACK; |
| p_learn | hccp->active = NULL;<br>hccp->standbylist: n elements; | send HELLO;<br>receive HELLO_ACK;<br>receive SYNC;<br>send SYNC_ACK; |

Figure 5B

CABLE NETWORK REDUNDANCY ARCHITECTURE

This invention is related to the following U.S. Patent Applications: U.S. patent application Ser. No. 09/484,189, filed on the same day as this patent application, naming Daruwalla, Forster, Roeck, Woundy, and Thomas as inventors, and titled "ROUTING PROTOCOL BASED REDUNDANCY DESIGN FOR SHARED-ACCESS NETWORKS"; and U.S. patent application Ser. No. 09/484,611, filed on the same day as this patent application, naming Daruwalla, Forster, Roeck, Chapman, Zang, and Lu as inventors, and titled "METHOD FOR A CABLE MODEM TO RAPIDLY SWITCH TO A BACKUP CMTS". These applications are incorporated herein by reference in their entireties and for all purposes.

BACKGROUND OF THE INVENTION

This invention relates to digital cable network technology. More specifically, it relates to methods and apparatus that provide redundancy for critical headend components of digital cable networks.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and demodulate downstream RF signal to bit streams for use by computers. The conversion is done at a subscriber's home. At a cable modem termination system ("CMTS") located at a head end of the cable network, the conversions are reversed. The CMTS converts downstream digital data to a modulated signal, which is carried over the fiber and coaxial lines to the subscriber premises. On the return path, the CMTS receives the modulated upstream signal, which it demodulates and transmits to an external node.

FIG. 1 is a block diagram of a typical two-way hybrid fiber-coaxial (HFC) cable network system. It shows a head end 102 (essentially a distribution hub) which can typically service about 40,000 homes. Head end 102 contains a CMTS 104 that is needed when transmitting and receiving data using cable modems. Primary functions of the CMTS include (1) receiving signals from external sources 100 and converting the format of those signals, e.g., microwave signals to electrical signals suitable for transmission over the cable system; (2) providing appropriate Media Access Control (MAC) level packet headers for data received by the cable system, and (3) modulating and demodulating the data to and from the cable system.

Headend 102 (and CMTS 104) connects through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 500 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

According to a current standard for transmission of data over cable networks (termed "DOCSIS"), there is no provision for any redundancy at the CMTS of the cable system. Therefore, a failure of the one of the CMTS will result in a service disruption or service outage of the cable modems relying upon the failed element. If a CMTS fails, for example, it may have to be repaired or replaced before service can resume. This means that service can be out for an extended period. From the perspective of the service provider and the end user, any type of disruption or delay in service is extremely undesirable.

This problem becomes particularly acute as broadband access technologies, including cable, move toward digital telephony (e.g., Voice over IP or "VoIP"). For these applications, rapid reliable cutover from a failed component becomes critical. If such technologies are to compete with analog telephony, a greatly improved protection/cutover technology is necessary.

It would be particularly desirable if the redundancy provisions employed the same downstream channel for both the normal and backup operations. This would free up more channels for transmitting content because a whole single channel need not be reserved for backup. It would also be particularly desirable if the redundancy mechanism did not require any changes to existing network protocols such as the DOCSIS standard for cable modem networks.

SUMMARY OF THE INVENTION

The present invention meets these needs by providing a CMTS redundancy technique with associated methods and apparatus. Redundancy requires at least two CMTS interfaces (e.g., line cards) on one or more CMTS chassis at the head end of a cable network. One of the CMTS interfaces ("CMTS" hereinafter) serves as a backup or "protecting" CMTS. When another CMTS (a "working" CMTS) becomes unavailable to service its group of cable modems, the protecting CMTS takes over service to those cable modems. The switchover takes place transparently (or nearly transparently) to the cable modems. Preferably, the protecting CMTS provides service on the same downstream channel as used by the working CMTS. Preferably, the cable modems need not modify any settings pursuant to their cable modem communication protocol (e.g., DOCSIS ranging). This transparency to the cable modems is realized by keeping the working and protecting CMTSs in synchronization regarding service parameters for the cable modems. In other words, the protecting CMTS maintains a list of current parameters for allowing service to the cable modems.

Among other aspects, this invention pertains to a method of providing backup service to a group of cable modems on a cable network having a working CMTS and a protecting CMTS. The method may be characterized as follows: (a) receiving information about the status of the group of cable modems from the working CMTS to thereby synchronize the protecting CMTS to the working CMTS; (b) determining that the protecting CMTS is to take over service to the group of cable modems; and (c) taking over service to the group of cable modems. In this manner, the group of cable modems need not change their settings when switching from the working CMTS to the protecting CMTS.

The protecting CMTS may obtain various types of information, in various formats, about the working CMTS's cable modems. In one format, the information arrives in a synchronization message from the working CMTS. Such message may be defined as part of a protocol between the working and protecting CMTSs. The information itself may include MAC and IP addresses of the cable modems in the group of cable modems. It may also include DOCSIS parameters for the cable modems of the group of cable modems.

When the protecting CMTS receives synchronization data, it should record this data so that it can provide rapid switchover service to the cable modems. As part of the process, the protecting CMTS may maintain a database of parameters and update that database upon receipt of fresh parameters. The CMTS-CMTS protocol may provide that when the protecting CMTS initially becomes available to service the cable modems, it receives an entire set of synchronization data for the group of cable modems from the working CMTS. Thus, the protecting CMTS's parameter database may be completely populated with current cable modem parameters. During normal operation, the protocol may provide that the protecting CMTS periodically receives updated information about the cable modems. This may take place whenever the cable modem data changes, for example.

As mentioned, the protecting CMTS preferably provides downstream messages to the group of cable modems on the same downstream channel as used by the working CMTS. In some embodiments, the protecting CMTS has its own group of cable modems that it provides service to. It may provide service to these modems on a downstream channel that is different from the channel employed by the working CMTS to service its own cable modems. In other embodiments, the protecting CMTS does not provide service to a second group of cable modems. Rather, it stands by idle, while in synchronization, waiting to take over service to the working CMTS's modems.

The protecting CMTS may use various techniques to determine that is should take over service to the group of cable modems. Examples include determining that the working CMTS is not responding to the protecting CMTS or is not providing downstream signals to a designated node on the cable network. In a specific example, the protecting CMTS makes the determination when the working CMTS does not acknowledge a HELLO message from the protecting CMTS within a predefined time. In another example, the protecting CMTS receives notification from a cable modem or an upconverter that a downstream signal from the working CMTS is no longer being received.

Another aspect of this invention provides a CMTS apparatus capable of acting as a protecting CMTS on a cable network having a group of cable modems to be serviced by a working CMTS, such that when the working CMTS becomes unavailable, the protecting CMTS can take over service to the group of modems. The CMTS apparatus may be characterized by the following features: (a) one or more processors; and (b) a memory, wherein at least one of the processors and the memory are configured or designed to receive and store synchronization data from the working CMTS. As mentioned, the synchronization data specifies information about the group of cable modems. The CMTS apparatus may be a complete CMTS or a portion of a CMTS such as a line card. The processors and/or the memory may be configured or designed to receive the synchronization data in the form of a synchronization message specifying at least one of addresses and the operating statuses of one or more of the cable modems in the group of cable modems. Further, the CMTS may be configured or designed to periodically send HELLO messages to the working CMTS to confirm that the working CMTS is operating.

Further, the CMTS should be configured or designed to take over responsibility for service to the group of cable modems upon determining that the working CMTS is or will become unavailable to service the group of cable modems. As mentioned, this service should use a downstream frequency that is identical to a downstream frequency used by the working CMTS. As part of this service, the protecting CMTS may send synchronization information to the working CMTS (now serving in a standby state) pertaining to the group of cable modems.

Another aspect of the invention pertains to a CMTS apparatus capable of acting as a working CMTS. The CMTS apparatus may be characterized by the following features: (a) one or more processors; and (b) a memory, wherein at least one of the processors and the memory are configured or designed to send synchronization data to the protecting CMTS, the synchronization data specifying information about the group of cable modems. In a specific embodiment, the CMTS apparatus is configured or designed to send HELLO acknowledge messages to the protecting CMTS upon receipt of a HELLO message from the protecting CMTS. In another specific embodiment, the CMTS apparatus is configured or designed to send a switch request message indicating that the working CMTS wishes to have the protecting CMTS take over service to the group of cable modems.

Yet another aspect of the invention pertains to a method of providing working service to a group of cable modems on a cable network having a working CMTS providing service to the group of cable modems and having a protecting CMTS available to take over service to the group of cable modems. The method may be characterized as follows: (a) sending synchronization data about the group of modems to the protecting CMTS; (b) determining that the protecting CMTS should take over service to the group of cable modems; (c) notifying the protecting CMTS that it should take over service to the group of cable modems; and (d) discontinuing service to the group of cable modems. The types and formats of the synchronization data may be as described above. The method may also include receiving synchronization information, regarding the group of cable modems, from the protecting CMTS after discontinuing service to the group of cable modems.

In a specific embodiment, the method also involves determining that the protecting CMTS has become available to provide service to the group of cable modems. Then, sending the synchronization data involves sending information pertaining to all current parameters of the group of cable modems in order to allow the protecting CMTS to provide service to the group of cable modems. Assuming that the protecting CMTS is already available, method may determine that a parameter pertaining to at least one of the cable modems in the group of cable modems has changed. Upon making this determination, the working CMTS may send the synchronization data pertaining to the changed parameter in order to allow the protecting CMTS to provide service to the group of cable modems.

In a specific embodiment, determining that the protecting CMTS should take over service to the group of cable modems comprises receiving notification from a network node (e.g., a cable modem or an upconverter) that a downstream signal from the working CMTS is no longer being received. Also, notifying the protecting CMTS may include sending a "switch request" message to the protecting CMTS.

Another aspect of the invention pertains to computer program products including a machine readable medium on which is stored program instructions for implementing one or more of the methods described above. Any of the methods of this invention may be represented as program instructions that can be provided on such computer readable media.

These and other features and advantages of the invention will be presented in further detail below with reference to the associated drawings.

DETAILED DESCRIPTION OF THE PREFERRED EMBODIMENTS

I. Overview

The present invention may be implemented in many ways. Generally, the invention employs two or more CMTSs or CMTS interfaces: one active CMTS which services a group of cable modems and one standby CMTS which is ready to take over service to those cable modems should the active CMTS become unavailable for any reason.

While the following description regularly refers to "CMTSs," the network entities participating in this invention are not limited to CMTSs per se. One or both of the active and standby "CMTSs" could actually be a separate CMTS interface or line card. Possibly both the active and standby CMTSs are interfaces provided in the same CMTS chassis.

The terms "working CMTS" and "protecting CMTS" specify fixed types of CMTS. The working and protection statuses of the CMTSs never change, regardless of whether those CMTSs are actively servicing cable modems. The term "active CMTS" and "standby CMTS" refer to the dynamic states of CMTSs. An active CMTS is currently servicing a group of cable modems, regardless of whether that CMTS is statically designated a working CMTS or a protecting CMTS. A standby CMTS is a CMTS in a state that is available to take over service on behalf of another CMTS, the active CMTS, that is currently servicing the group of cable modems. Thus, an active CMTS may be servicing a group of modems on its own behalf (if it is the working CMTS) or on behalf of another CMTS (if it is the protecting CMTS).

Figure 1:
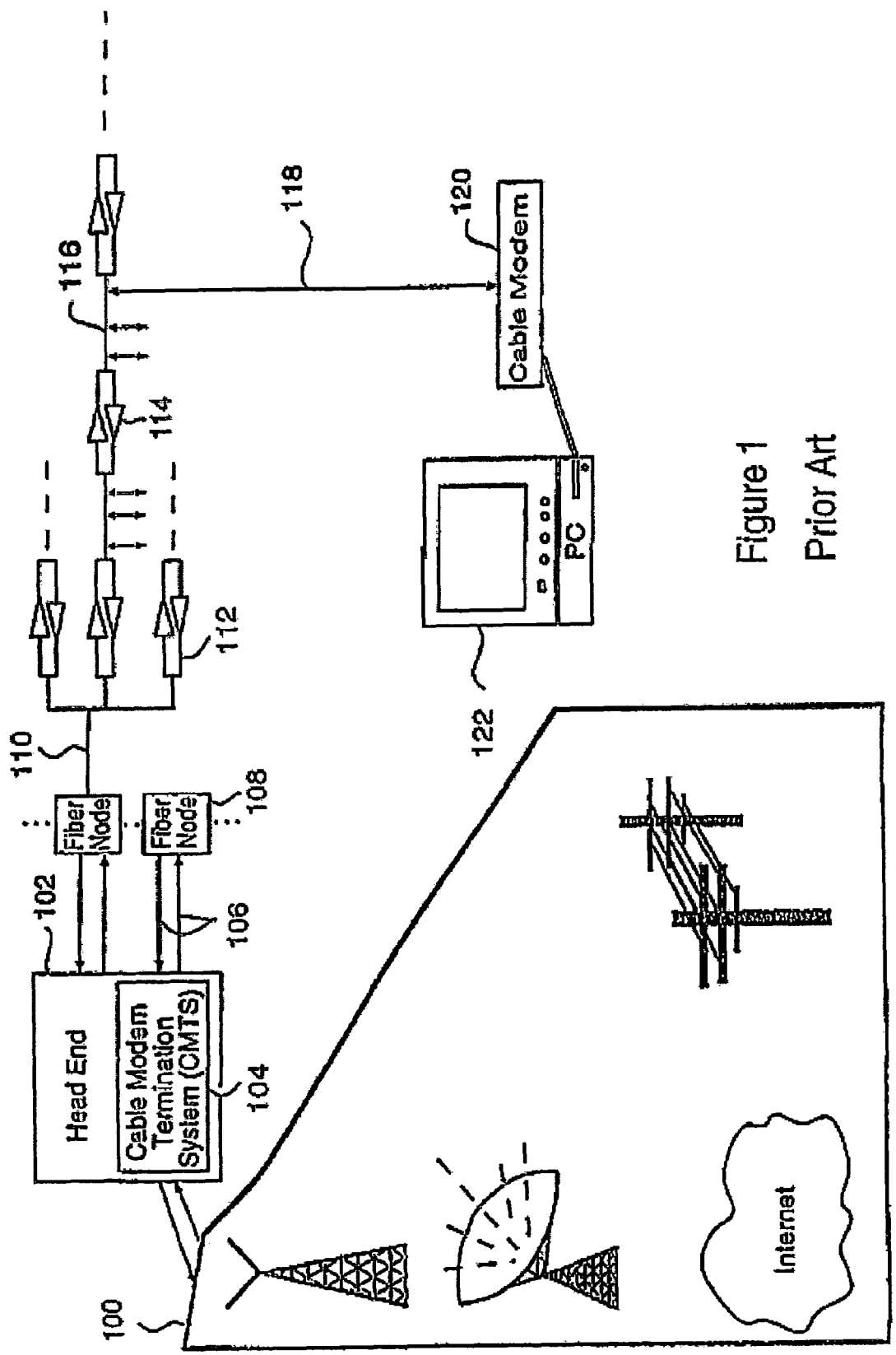
FIG. 1 is a block diagram depicting one type of cable modem network that may profit from the redundancy features of the present invention.
Figure 2A:
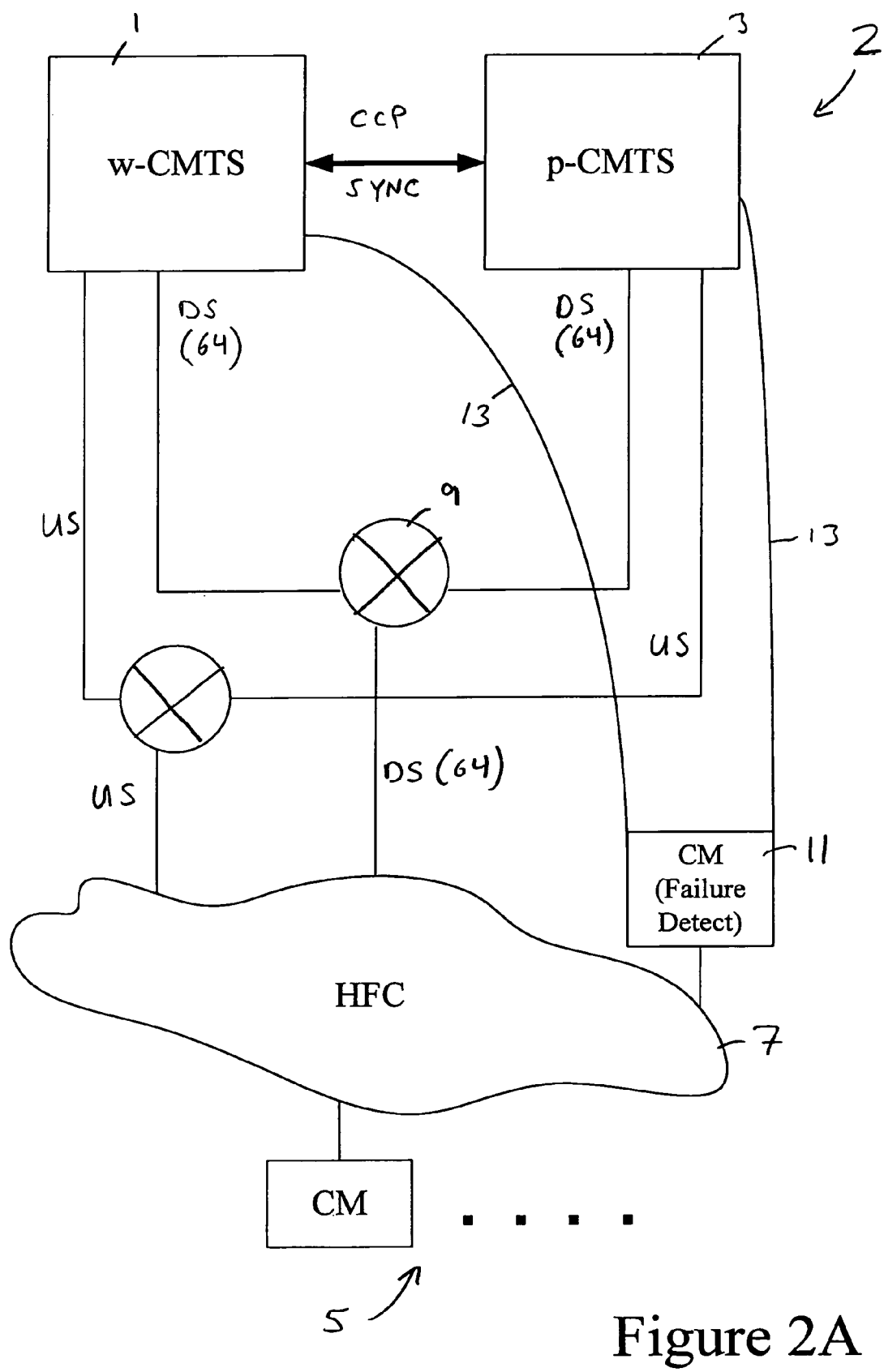
FIG. 2A is a block diagram depicting a general arrangement of CMTSs and cable modems suitable for use with a protocol of this invention.

FIG. 2A presents a block diagram of at least a portion of a cable network 2 including a working CMTS 1 and a protecting CMTS 3. Normally, working CMTS 1 services a group of cable modems 5 via an HFC network 7 (or other cable network infrastructure).

During normal operation, working CMTS 1 receives and updates stored data pertaining to the individual members of the group of cable modems 5. For example, working CMTS 1 may store the MAC and IP addresses of the individual cable modems, as well as the DOCSIS parameters for each of them.

Periodically, working CMTS 1 provides relevant data pertaining to the group of cable modems 5 to the protecting CMTS 3. This operation will be referred to herein as "synchronization." Preferably, it is implemented via a specific protocol between the working and protecting CMTSs. This protocol may be referred to at times as a "connection-to-connection protocol" ("CCP"). By synchronizing the protecting CMTS 3 with the working CMTS 1, the protecting CMTS 3 can take over service to the group of modems 5 immediately and transparently when necessary.

Preferably, the group of cable modems 5 need not take any specific steps to maintain their network connections after the transition from the working to the protecting CMTS. To this end, the downstream and upstream channels between the group of cable modems 5 and the headend need not change when the protecting CMTS takes over for the working CMTS.

In the example depicted in FIG. 2A, working CMTS 1 normally provides service to cable modems 5 on a downstream channel 64. Should it become necessary for protecting CMTS 3 to take over service, it too communicates with cable modems 5 on downstream channel 64. At the time of transition, a combiner 9 insures that downstream signal from protecting CMTS 3 reaches cable modems 5.

The switch over from working CMTS 1 to protecting CMTS 3 can be triggered by a variety of mechanisms. In one case, working CMTS 1 will determine that it will become unavailable and notifies protecting CMTS 3 of this fact via the CCP protocol, for example. This may be the case when, for example, working CMTS 1 is being taken out of service for scheduled maintenance, a software upgrade, etc. It is also possible that working CMTS 1 will fail in an unpredictable manner. When this is the case, the system must detect this immediately and inform protecting CMTS 3 that is now responsible for cable modems 5. Such notification may be accomplished in various ways. In one example, protecting CMTS determines that working CMTS is not responding over the connection-to-connection protocol. As described below, the CCP may require sending periodic HELLO messages to working CMTS 1. If such messages are not acknowledged within a certain period of time, protecting CMTS 3 may assume that working CMTS 1 is no longer servicing cable modems 5.

It is, of course, possible that the working CMTS 1 may be responding appropriately via the CCP but not providing downstream signals to cable modems 5. This may result when an upconverter or some other mechanism located between the downstream interface on working CMTS 1 and the HFC segment 7 has failed. To address the situation, the system may employ a test or monitoring cable modem or other node 11 which determines whether downstream signal is being received from working CMTS 1. When cable modem 11 makes its determination, it notifies one or both of working CMTS 1 and protecting CMTS 3 via a "side network" 13. This may be an Ethernet, telephone, serial, or other connection that does not require the infrastructure of the cable plant.

II. Topologies

Figure 2B:
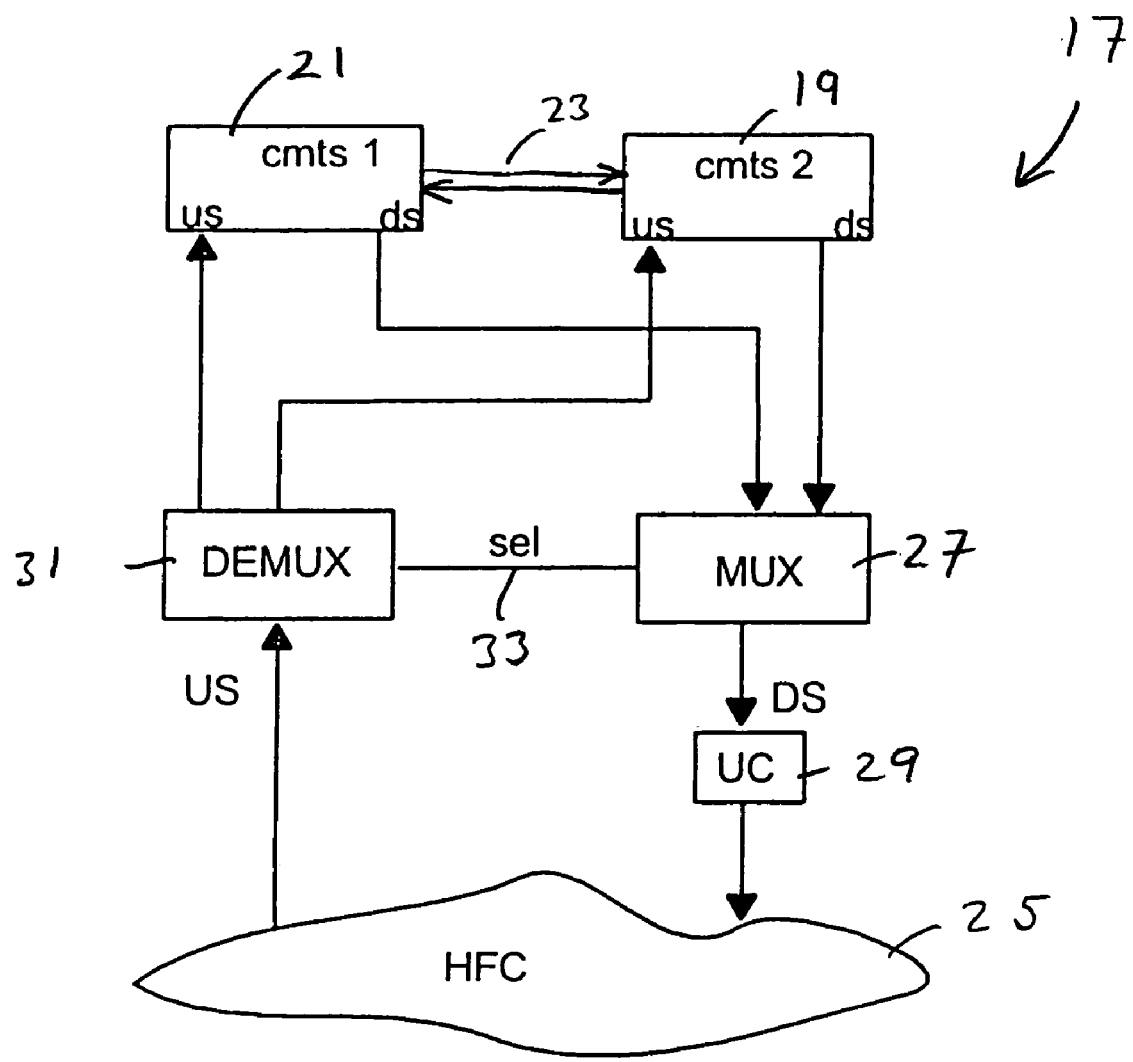
FIG. 2B is a block diagram depicting a 1+1 topology suitable for use with this invention.
Figure 2C:
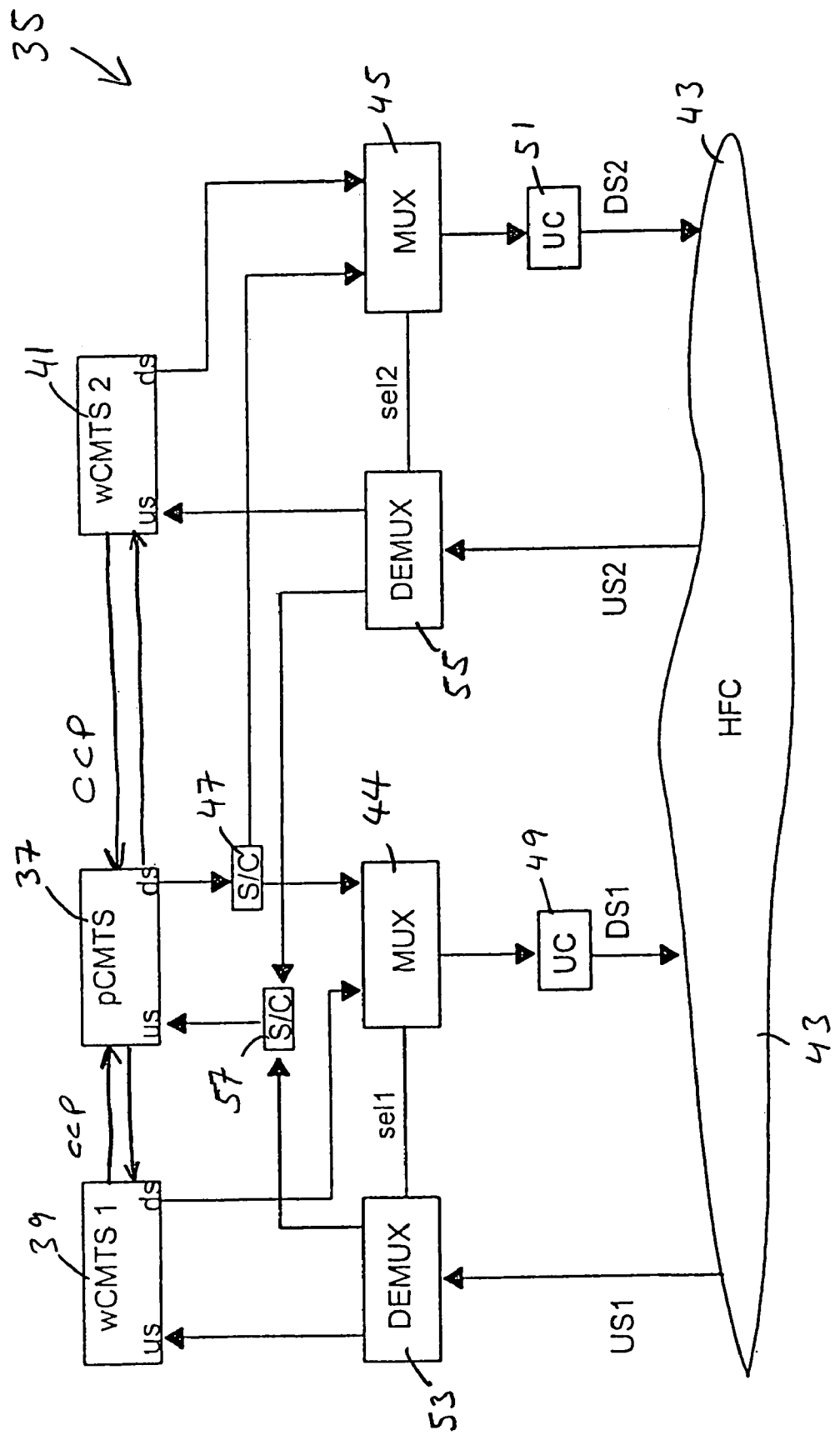
Figure 2D:
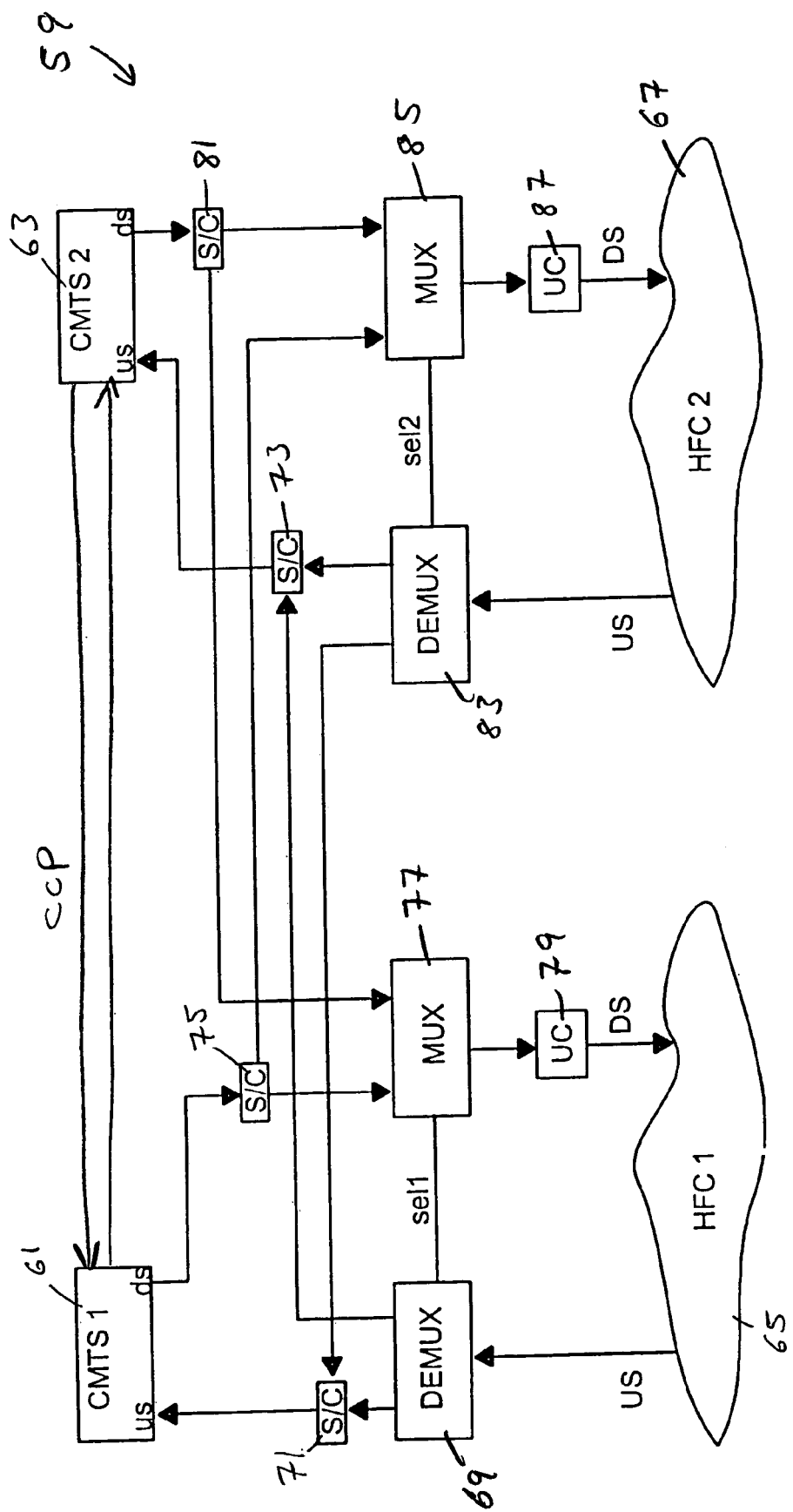
Figure 2E:
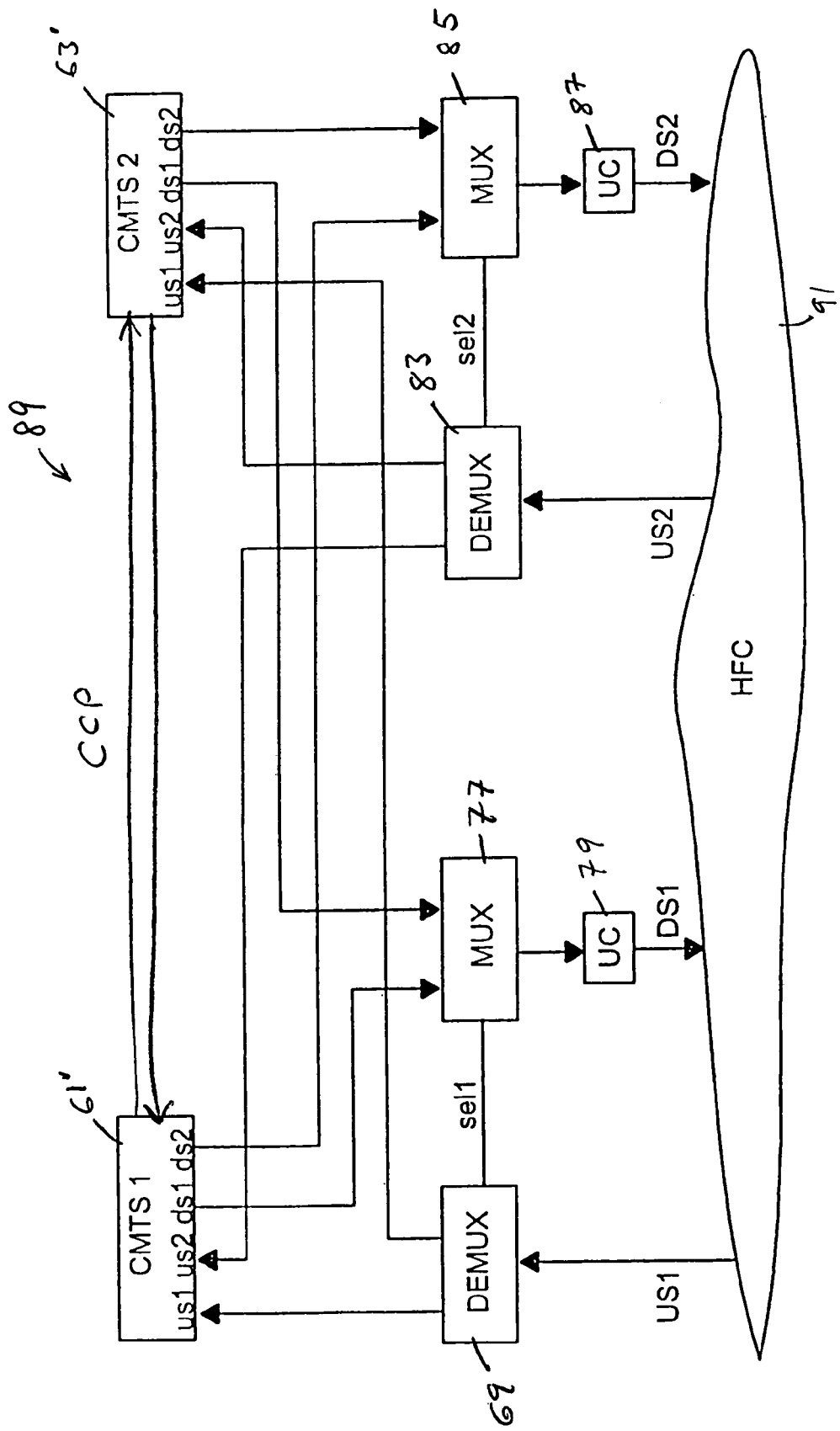

The present invention may be implemented in various topologies. FIGS. 2B–2E present four specific examples of such topologies. FIG. 2B represents a "1+1" scenario. FIG. 2C represents a 1+2 scenario, FIG. 2D represents a 1:1 scenario, and FIG. 2E represents a different 1:1 scenario. In each example, one or more multiplexer and demultiplexer is set by one or more select signals to allow an active CMTS (whether working or protecting) to control communication of a group of cable modems. The select signals may be controlled by any of the CMTSs, depending upon the current conditions and the particular CMTS-CMTS protocol in use.

Referring now to FIG. 2B, a 1+1 topology 17 is depicted. In this topology, a protecting CMTS 19 serves as a dedicated backup for a working CMTS 21. During normal operation, protecting CMTS 19 is idle except for its participation in the connection-to-connection protocol as depicted by reference numeral 23.

Also during normal operation, working CMTS 21 provides downstream signals to an HFC plant 25 via a multiplexer 27, as shown. In this example, the multiplexer 27 resides within the headend of a cable plant. Therefore, multiplexer 27 is located upstream to an upconverter 29. Note that upconverters are typically employed to convert "intermediate frequency" signal to radio frequency signal suitable for transmission over an HFC network.

Note that the multiplexers and demultiplexers shown here and in the other topologies need not represent physical devices. More generally, they represent the concepts of multiplexing and demultiplexing that may be implemented in numerous devices or combinations of devices.

Upstream signals from cable modems on HFC 25 pass through a multiplexer 31 on their way to the upstream port of working CMTS 21. Both demultiplexer 31 and multiplexer 27 are controlled by a select signal 33.

In the event that working CMTS 21 can no longer service cable modems on HFC 25, protecting CMTS 19 will take over responsibility for those cable modems. At that point, select signal 33 changes to select the upstream path to CMTS 19 and the downstream path from CMTS 19. As shown, protecting CMTS 19 includes an upstream port connected to receive upstream signals via demultiplexer 31. CMTS 19 also includes a downstream port connected to multiplexer 27 for providing downstream signals to HFC network 25.

FIG. 2C illustrates 1+n topology 35. In this example, a single protecting CMTS 37 protects both a first working CMTS 39 and a second working CMTS 41. Should either of these working CMTSs become unavailable for service to an HFC network 43, protecting CMTS 37 will take over for the unavailable working CMTS.

In this example, working CMTS 39 provides downstream signals on a first downstream channel and working CMTS 41 provides downstream signals on a second, different, downstream channel. Preferably, protecting CMTS 37 provides service on the same downstream channel as the working CMTS for which it is taking over. Thus, in most embodiments, protecting CMTS 37 can service only one of working CMTS 39 and working CMTS 41 at any given time. In the depicted embodiment, 2-to-1 multiplexers 44 and 45 reside on the downstream intermediate frequency paths of working CMTS 39 and working CMTS 41, respectively.

These multiplexers also receive signals from a downstream port of protecting CMTS 37 when it is acting on behalf of one of the working CMTSs. Note that downstream signals from protecting CMTS 37 pass through a splitter/combiner 47 that routes the signal to both multiplexer 44 or multiplexer 45, as appropriate. Downstream signals from multiplexers 44 and 45 are upconverted to radio frequency signals of appropriate frequency by upconverters 49 and 51, respectively.

During normal operation, upstream signals from cable modems on HFC networks 43 pass through demultiplexers 53 and 55 on their way to working CMTSs 39 and 41, respectively. Should protecting CMTS 37 have to take over for either of the working CMTSs, the appropriate demultiplexer will route upstream signals to protecting CMTS 37. A combiner 57 directs upstream signals from the appropriate demultiplexer to an upstream port on protecting CMTS 37.

Note that because the two working CMTSs operate at different downstream frequencies, select signals (referenced by sel1 and sel2 in the figure) will not both be set in favor of the protecting CMTS at the same time. Again, the protecting CMTS 37 can only take on the role of one of the working CMTSs at any moment.

The example of FIG. 2C shows a 1+2 topology 35. This topology is easily extended to the arbitrary case of the 1+n topology. A 2-to-1 multiplexer is placed on the downstream path of each working CMTS and a 2-to-1 demultiplexer is placed in front of the upstream input of each working CMTS. In addition, an n-way splitter/combiner is placed in front of each of the upstream and downstream ports of the protecting CMTS.

Turning now to FIG. 2D, a 1:1 topology 59 is depicted. In this example, two working CMTSs 61 and 63 each serve as the protecting CMTS for the other. In the implementation shown, each CMTS operates in a different cable plant but on the same downstream frequency. Working CMTS 61 works on HFC network 65 and working CMTS 63 works on HFC network 67. Because of the requirement that the ranging parameters be unchanged during switch over, the two cable networks are preferably very similar and the two CMTSs are preferably co-located, so that the round-trip propagation delay does not take the protecting CMTS out of tolerance. In another implementation where one CMTS cable interface supports two downstream frequencies, the two CMTSs may work in one cable plant but on different downstream channels.

As shown in the Figure, upstream signals from cable modems on HFC network 65 normally pass through a demultiplexer 69 and then through a splitter/combiner 71 on their way to an upstream port of CMTS 61. Should CMTS 61 become unavailable for any reason, a select 1 signal to demultiplexer 69 will cause upstream signals to be redirected to CMTS 63 via a splitter/combiner 73.

During normal operation, downstream signals from CMTS 61 pass to cable modems on HFC network 65 via a splitter/combiner 75, a multiplexer 77 (under the control of the select 1 signal) and an upconverter 79. If CMTS 61 should become unavailable for any reason, the select 1 signal will be sent so that multiplexer 77 passes downstream signal from CMTS 63 via a splitter/combiner 81.

Normal operation of CMTS 63 and the cable modems on HFC network 67 operate in a similar fashion, with a select 2 signal controlling a demultiplexer 83 and a multiplexer 85 in a manner that allows CMTS 61 to take over for CMTS 63.

An upconverter 87 is provided on the downstream path to HFC network 67. Note that in all the examples depicted here all multiplexing and demultiplexing are performed within a head end, upstream from an upconverter. The invention is not limited to this topology. Further, some cable plants do not employ upconverters at all. Rather, the CMTSs send and receive signals at a radio frequency suitable for use in the corresponding HFC networks. In such cases, no upconverters are necessary.

FIG. 2E illustrates the above-mentioned 1:1 topology in which the CMTS cable interfaces support two downstream frequencies and the two CMTSs work in a single cable plant but on different downstream channels. This topology is represented by reference numeral 89. It is similar to topology 59 except that separate HFC network 65 and 67 are replaced with a single HFC network 91. Further, there is no need for splitter/combiners in topology 89. Note that he individual CMTSs 61' and 63' in this example each support two separate downstream channels. They should also be capable of supporting two separate upstream channels. Thus, for example, CMTS 63' normally provides service to its cable modems via a downstream port ds2. If it should take over responsibility for the cable modems normally serviced by CMTS 61', it provides downstream to those cable modems via a downstream port ds1. Similarly, CMTS 63' normally receives upstream signals from its cable modems via an upstream port us2. If CMTS 63' needs to take over service to the cable modems of CMTS 61', it does so via an upstream port us1. CMTS 61' has its responsibilities similarly divided among local ports.

In topologies 59 and 89, CMTS 61 (or 61'), as protector of CMTS 63 (or 63'), is the major controller of the select 2 signal. Similarly, CMTS 63 (or 63'), as a protector of CMTS 61 or (61'), is the major controller of the select 1 signal.

In the topologies described here, it may be desirable that the multiplexers and demultiplexers are controlled by separate non-cable interfaces such Ethernet or RS-232 interfaces. Each of the working CMTS and the protecting CMTS can connect to one control interface and can switch the multiplexer/demultiplexer.

Often, the working CMTS will provide routing services for its cable modems and other CMTSs/routers on a network. In a preferred implementation, when a working CMTS is switched to standby status, it removes its host routes from its routing table and deletes the contents of its routing cache and address resolution protocol (ARP) cache. In the meantime, the activated CMTS (the protecting CMTS) adds the host routes to its routing table. If the IP addresses are in a single subnet, this subnet is removed from the one CMTS and added to the other. When this procedure is completed, the routing protocol is responsible for routing convergence. To this end, the subnet IP address and mask information should be exchanged between the working and protecting CMTSs.

As noted, 1+1 is the simplest case of 1+n. Protecting and working CMTSs share one upstream and one downstream frequency in a common cable plant. The CMTS switchover can be made transparent to the cable modems at layer 2 and above. This protection may be implemented at the card level. In the 1:n topology, it may sometimes be appropriate to have the cable modems perform a MAC layer recovery including at least ranging. In a preferred embodiment, the protection and switchover is accomplished using the DOCSIS protocol alone, without need for additional protocols or modifications to DOCSIS, at least as it pertains to the communications between the individual cable modems and CMTSs. As explained in more detail below, the CMTS connection-to-connection protocol may be used for this purpose.

Note that it may be possible in a 1:1 topology to achieve switchover without causing the individual cable modems to do ranging with the protecting CMTS. To make this possible, it may be necessary that the two CMTSs be co-located so that the ranging results for the different cable modem groups are close enough to be under tolerance.

In the 1+n protection, the numbering space in each CMTS is preferably identical. In the 1:1 protection, the two CMTSs should share a single numbering space with each one having a designated upper and lower limits of relevant identifiers. For example, a CMTS 1 may be given service ID (SID) numbers 1:3FFF and a CMTS 2 may be given the SID range 4000:7FFF. Each CMTS in one protection group should have the same capability in terms of UCD (upstream channel description), CoS (class of service), QoS (quality of service), PHS (payload header suppression), etc. To simplify implementation, the identifiers should be 1-1 mapped and the protecting CMTS should store copies of the entire cable modem service database for each working CMTS.

III. Connection-to-Connection Protocol

As indicated, the working and protecting (or active and standby) CMTSs can remain in synchronization by providing a connection-to-connection protocol between CMTSs. Generally, such protocol should provide the standby CMTS with all parameters necessary to take over service to the cable modems of the active CMTS. The parameters may include, for example, a list of addresses for all cable modems being serviced and the current DOCSIS parameters of these modems. By keeping this information with the standby CMTS, it can take over service without requiring special input from the cable modems. The connection-to-connection protocol may also allow the CMTSs to determine when one of them expectedly or unexpectedly goes off line.

The following discussion presents one example of a connection-to-connection protocol that may be suitable for implementing the present invention. In the described embodiment, the protocol allows the working and protecting CMTSs to exist in one of four states at any given time. The working and protecting versions of these states are similar but not identical. When a CMTS initially powers up or comes on line, it temporarily exists in an "init" state. In this state, it determines whether it has any peers and, if so, what states they are in. If it determines that a group of cable modems is not currently being serviced by any other CMTS, it enters a "stand alone" state and takes over service to the group. If it determines that another CMTS is actively servicing cable modems that it could handle, it enters a "learn" (standby) state. Here it receives synchronization messages from the other CMTS. Finally, if it determines that another CMTS is available but not currently servicing its cable modems, the new CMTS transitions from the init state to a "teach" (active) state where it takes over service for the cable modems.

CCP Packets

Figure 3A:
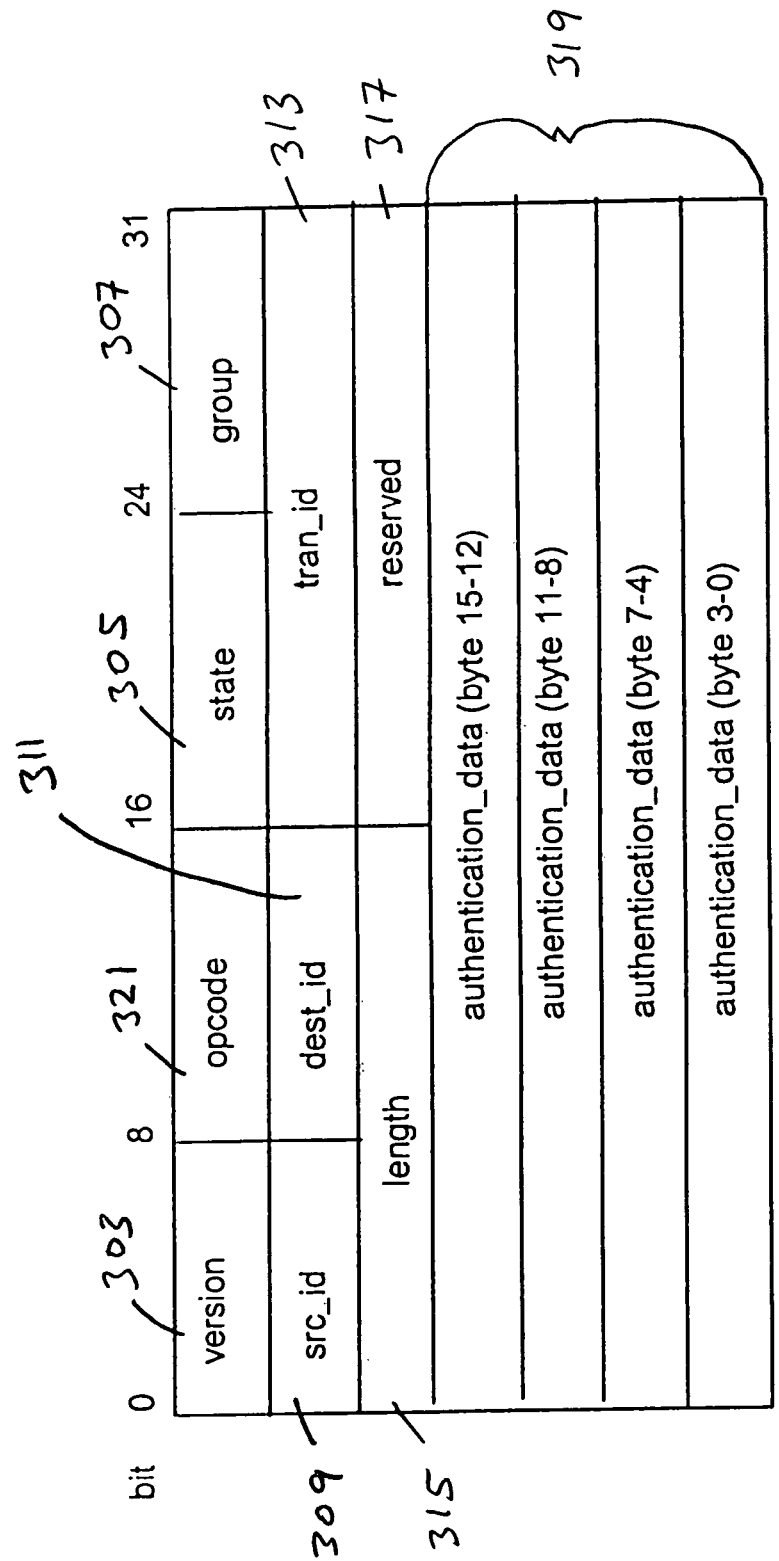

The working and protecting CMTSs communicate via CCP packets, preferably UDP datagrams. In a preferred embodiment, these have a specific header format 301 as illustrated in FIG. 3A. As shown header 301 includes a 1 byte "version" field 303 that specifies of the version of the CCP in operation. In a specific embodiment, the version field can also be used to turn on/off authentication by the MSB: 0-enabled, 1-disabled. A 1 byte "state" 305 indicates the current state of the sender (e.g., 0—init, 1—standalone, 2—teach, 3—learn). Next, the header 301 includes a 1 byte "group" field 307 that identifies a protection group (i.e., a group of modems that are to be serviced by the working and protecting CMTSs in the group). Valid number is 1–255. Only CMTS members of the same group talks to each other in CCP.

Another field of the packet header 301 is a 1 byte "src_id" 309 that provides a membership identifier of the sender. Valid numbers for working CMTSs are 1–255. 0 is reserved for protecting CMTS in a group. A 1 byte "dest_id" 311 provides a membership identifier of the receiver. Valid numbers for the working CMTSs are 1–255. 0 is reserved for protecting CMTS in a group. Next, header 301 includes a 2 byte "tran_id" field 313 that is used to track message order. A 2 byte "length" field 315 specifies the total length of a CCP message, excluding its header. A 2 byte "reserved" field 317 specifies a data field which is reserved. Authentication data 319 contain encrypted authentication data (e.g., MD5 or SHA encrypted data) in a 16 byte field for example. In a specific embodiment, if the MSB of version field 303 is 0, authentication is disabled and these 16 bytes are not shown in message.

Finally, an 1 byte "opcode" field 321 specifies the type of message contained in this packet. Possible values are HELLO, HELLO_ACK, SWITCH_REQ, SWITCHOVER, SYNC, SYNC_ACK.

(A)—HELLO

HELLO is a one-way message sent from the protecting CMTS to all working CMTSs known in the group. It indicates that the protecting CMTS is ready to receive data. In return, the protection CMTS expects to receive a HELLO_ACK message. A HELLO message serves the following purposes:

Indicates the existence and state of the protecting CMTS. Failing to send this message indicates that the protecting CMTS is not in service.

Network inconsistency is inevitable during transition. A HELLO message should be used for CMTS state consistency recovery.

One example of a CCP HELLO message format 323 is illustrated in FIG. 3B. This information shown serves as a payload to CCP message having a header 301. As shown, the payload includes a 1 byte "owner_id" field 325 that identifies the membership of the working CMTS that the protecting CMTS is forwarding traffic on behalf of. It is 0 when the protecting CMTS is not forwarding traffic. The next field of interest is a 2 byte "hello_time" field 327 that specifies the interval in milliseconds between successive HELLO messages sent from a protecting CMTS. Finally a 2 byte "hold_time" field 329 specifies the interval in milliseconds between when the working CMTS receives a HELLO message and when the working CMTS must send a successive HELLO message to avoid a presumption that the protecting CMTS has failed. The hold_time also specifies the interval in milliseconds between when the protecting CMTS sends a HELLO message and when it concludes that the working CMTS has failed because it did not reply with a HELLO_ACK. In the context of voice data transmission, the hold_time, as the communication path failure detection time, should be less than a call drop time. A typical hold_time may be 3~5 times the hello_time. Preferably, both of these values are configurable.

(B)—HELLO_ACK

This is a one-way message sent from a working CMTS to the protecting CMTS as acknowledgement of the HELLO message. Failing to receive a HELLO_ACK message, the protecting CMTS will consider the working CMTS to be unavailable. The HELLO_ACK message should retain the "tran_id" and "group" field values of the CCP header in the corresponding HELLO message. The HELLO_ACK message should have an empty message payload.

(C)—SWITCH_REQ

The SWITCH_REQ message is a one-way message sent from a working CMTS to the protecting CMTS. It indicates that the working CMTS wishes to switch its state from teach to learn or vice versa. The protecting CMTS is expected to reply with a SWITCHOVER message. Before receiving a SWITCHOVER message, the working CMTS may issue multiple SWITCH_REQ messages but with the same tran_id and group number. The payload of a SWITCH_REQ message is empty.

(D)—SWITCHOVER

The SWITCHOVER message is a one-way message sent from the protecting CMTS to a working CMTS, as a reply to SWITCH_REQ (solicited) or sua sponte (unsolicitedly). This message type is special in the sense that it forces a switch-over action. It indicates an agreement of switch-over. Upon sending/receiving this message, the working CMTS switches modes immediately. The payload of a SWITCHOVER message is empty. This message may be sent by a working CMTS, a protecting CMTS, or a third party.

(E)—SYNC

CCP carries DOCSIS or other network layer information in a SYNC message. A CMTS (working or protecting) in teach state sends SYNC messages to the standby (in learn state). If the sender is a working CMTS, this message is directed to the protecting CMTS; if the sender is the protecting CMTS, this message is directed to the owner of its active member. The SYNC message provides information per cable modem or per physical channel. The TLVs in the message payload vary with type field. The SYNC message is event driven and triggered when (a) local configuration changes are detected or (b) a standby CMTS (in learn state) is just discovered.

Figure 3C:
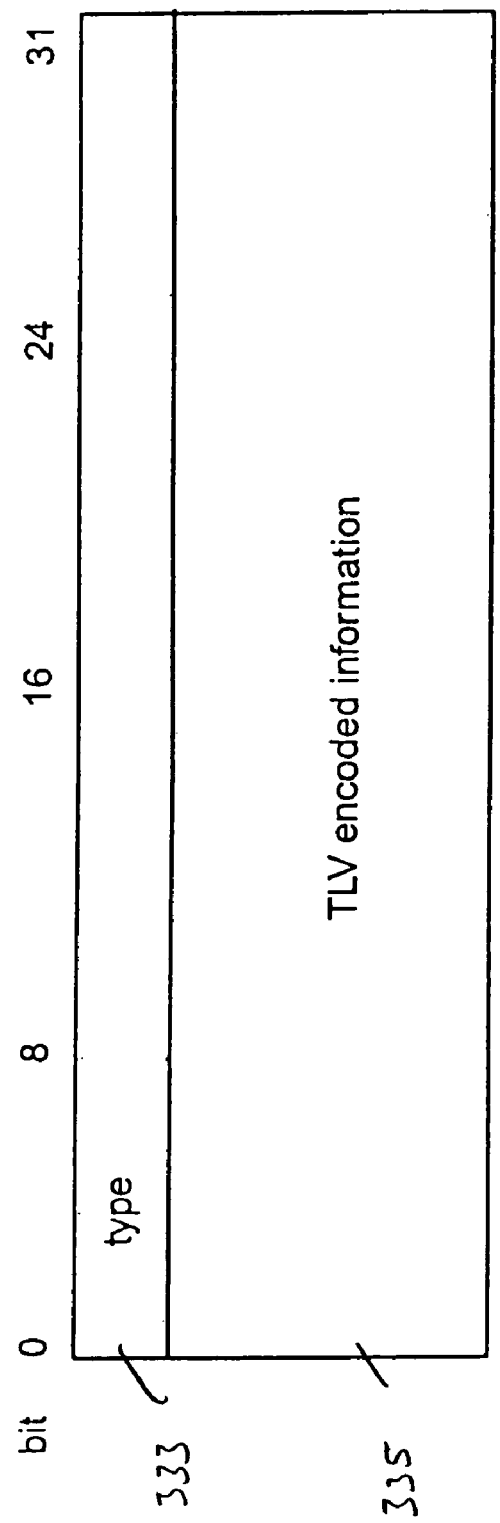

In one embodiment, a SYNC message is in the format shown in FIG. 3C. As shown, a SYNC message payload 331 includes TLV encoded information 335 and a 1 byte "type" field 333. The type specifies the sub-field of SYNC message contained in this packet. It is used to perform static and dynamic configuration on the counterpart and may include layer 3 (OSI model) information as well. If the message is a per cable modem SYNC message, a TLV for cm_mac_address should follow type field.

FIG. 4 presents a table of type fields in a CCP SYNC message. Remember that this is but one example of the range of available SYNC messages. In general, the goal of synchronization is to ensure that the backup CMTS has all parameters needed to immediately take over service to the cable modems currently being serviced by a working CMTS. FIG. 4 emphasizes some relevant DOCSIS parameters.

As shown, a LOCKOUT message name tells a protecting CMTS that the teaching working CMTS is not switchable. An UNLOCKOUT message name tells a protecting CMTS that the teaching working CMTS is switchable. A RESYNC message name tells the protecting CMTS that the teaching working CMTS is performing a resynchronization of its entire database. A REG message name indicates cable modem registration information. The SYNC message contains DOCSIS REG_REQ TLVs. A UCD message name specifies upstream channel description and contains DOCSIS UCD TLVs. A RNG message name specifies cable modem ranging. The SYNC message contains DOCSIS RNG_RSP TLVs. A DSA message name specifies cable modem dynamic service add. The SYNC message contains DOCSIS DSA_REQ TLVs. A DSD message name specifies cable modem dynamic service delete. The SYNC message contains DOCSIS DSD_REQ TLVs. A DSC message name specifies cable modem dynamic service change. The SYNC message contains DOCSIS DSC_REQ TLVs. A BPKM message name specifies cable modem baseline privacy key management. The SYNC message contains DOCSIS(8) TLVs. An SNA message name specifies subnet. The SYNC message contains the MAC and IP address and IP mask for the subnet of the cable modems and CPE (customer premises equipment) to be added. In a very specific embodiment, 6 bytes are reserved for the MAC address, 4 bytes are reserved for the IP address, and 4 bytes are reserved for the IP mask. An SND message name specifies subnet delete. The SYNC message contains the MAC and IP address and IP mask for the subnet of cable modems and CPE to be deleted. In a specific embodiment, 6 bytes are reserved for the MAC address, 4 bytes are reserved for the IP address, and 4 bytes are reserved for the IP mask. A SYNC message name provides time synchronization information. The SYNC message contains a DOCSIS SYNC Timestamp.

The SYNC message type of a SYNC CCP packet is used to synchronize the timestamp between the protecting CMTS and a working CMTS so that the cable modems avoid SYNC loss due to big shift in timestamp during failover. It may not be necessary to adjust round-trip-delay because the cable modems normally adapt to small change in a timestamp.

As an optimization, a SYNC message may be treated as a proxy of a HELLO message because a long SYNC message may suppress one or more HELLO messages.

All types of messages can be aggregated. The contents of "type" are easily extensible to accommodate various needs of applications. DOCSIS data may be built into an active member database; CCP SYNC data is built into standby member database.

(F)—SYNC_ACK

This is acknowledgement of a SYNC message. It is sent whenever a SYNC message is received. In one embodiment, the SYNC_ACK message contains no indication as to whether synchronization has succeeded or failed. A SYNC_ACK message should retain the "tran_id" and "group" field values of the CCP header in the corresponding SYNC message. It should have an empty message payload.

As mentioned, the SYNC_ACK message may be treated as proxy of a HELLO message.

In the general approach, if a CMTS sends a SYNC message and then notes a time-out in receiving a SYNC_ACK message, it should resend the SYNC message until a SYNC_ACK message is received or a hold time expires. The next SYNC message will not be sent out unless an acknowledgement for the previous message is received. This is to guarantee the SYNC message is received and is in order.

Failure Notification

Three examples of CCP failure notification will now be described.

(A) Working CMTS Initiated Switchover

When a working CMTS in a teach state detects failure or performance degradation, or administratively goes down, it sends a SWITCH_REQ message and waits for a SWITCHOVER message as a final switchover decision. After receiving the SWITCHOVER message, CCP on the working CMTS interface may be terminated. In some cases, it may also terminate before receiving a SWITCHOVER. When a working CMTS in learn state decides to perform "revert switching," it sends a SWITCH_REQ message.

(B) Protecting CMTS Initiated Switchover

The protecting CMTS sends a HELLO message to all working CMTSs under its protection. If a working CMTS cannot reply with a HELLO_ACK message for n (configurable) retries, it is considered to be out of service. If at this moment, the protecting CMTS is in init or learn state, it should immediately issue an unsolicited SWITCHOVER message to the failed working CMTS, switch MUX/DE-MUX to its side and begin forwarding traffic. However, if the protecting CMTS is currently in standalone state, it does nothing. If it is currently in the teach state, it transitions to the standalone state.

(C) Third Party Initiated Switchover

A third party, such as a redundant upconvertor, can send a SWITCHOVER message to both the working CMTS(s) and the protection CMTS. The nature of such failure may be a downstream upconvertor defect, for example. The CMTS receivers of this message immediately update their state but need not interfere with the upconverter device. In another example of a third party initiated switchover, a detective cable modem sends a notification "I see failure" to the protecting CMTS. The nature of the failure is a downstream or upstream channel defect. After the protecting CMTS figures out which working CMTS is responsible for the failure, it issues SWITCHOVER and toggles RF MUX. An "I see failure" API can be provided in the appropriate CCP version. Preferably, any third party device designated for failure detection is communicates detected failures via a side network such as an Ethernet network, a dial up connections, etc.

Internal States

As mentioned, working CMTSs and protecting CMTSs have different definitions of internal states. The stable states of a working CMTS are shown in FIG. 5A. The stable states of a protecting CMTS are shown in FIG. 5B. As shown in FIG. 5A, a working CMTS in the "init" state is not actively servicing cable modems and is not available to take over responsibility for any other CMTS (the "standby list" has 0 elements). In the "standalone" state, the working CMTS is actively forwarding traffic (the active status is not null). While in this state, the CMTS is not available to take over responsibility for any other CMTS. In the "teach" state, the working CMTS is again active and not available to other CMTSs. Unlike the standalone state, the teach state requires that the CMTS interact with a protecting CMTS by sending HELLO_ACK and SYNC messages and receiving HELLO and SYNC_ACK messages. The last state for a working CMTS is the "learn" state. In this state, it is not active, but is available to take over service for its group of cable modems; the standby list has one element. Like the teach state, the learn state requires that the working CMTS communicate with a protecting CMTS. Thus, the working CMTS receives HELLO messages and sends HELLO_ACK messages. However, unlike the teach state, the learn state requires that the working CMTS remain in synchronization with the protecting CMTS by receiving (not sending) SYNC messages. This is necessary because the protecting CMTS is actually servicing the cable modems at that time.

Turning now to FIG. 5B, a table shows that the protecting CMTS in the init state behaves in the same manner as a working CMTS in the init state. In the standalone state, the protecting CMTS is active and has n–1 elements on its standby list. Normally, the protecting CMTS is subservient to n different working CMTSs. When in the standalone state, it is actually acting on behalf of one of those CMTSs, so the standby list has n–1 elements. Note that the protecting CMTS in the standalone state continues to send HELLO messages and receive SYNC messages. This constitutes CCP communication with other working CMTSs that it protects for. In the teach state, the protecting CMTS is again active and again has a standby list of n–1 elements. However, unlike a protecting CMTS in the standalone state, a protecting CMTS in the teach state must keep a working CMTS in synchronization with its own cable modems. Thus, a protecting CMTS sends SYNC messages to that working CMTS. It also receives SYNC messages from any other working CMTS that it protects for. Finally, while in the learn state, the protecting CMTS is not active and it maintains the full standby list of n elements. It receives SYNC messages from all working CMTSs that it services.

Working CMTS Events

A working CMTS regularly receives SYNC_ACK in the teach state and SYNC in the learn state. HELLO_ACK and SWITCH_REQ are illegal for a working CMTS to receive in any state.

(A) Receive HELLO-switchover-for-me/HELLO-no-switchover-for-me

When a working CMTS sees a HELLO message that specifies a forwarding mode, it checks the owner_ip_address in the packet. If the IP address matches its own IP address, this HELLO message is called "HELLO-switchover-for-me." If the IP address does not match, or the HELLO message specifies a blocking mode (the protecting CMTS is in the teach state), it is called "HELLO-no-switchover-for-me."

(B) Missing HELLO

If a working CMTS cannot receive a HELLO message after n (configurable) retries, it is called a "missing HELLO", and the protecting CMTS is considered potentially out of service. The working CMTS then switches the RF MUX to its side and changes its state to "standalone".

(C) Receive SWITCHOVER

A working CMTS receives a SWITCHOVER message from a protecting CMTS. This message can be a response to a previously issued SWITCH_REQ message, or an unsolicited message.

(D) Receive Failover Notice

A working CMTS can receive a failover notice from a third party, such as a redundant upconvertor or a cable modem.

When a communication path between a working CMTS and a protecting CMTS is down but the HFC network is working, "missing HELLO" and "missing HELLO_ACK" events result in the ambiguity of a CMTS state. Both CMTSs believe that they are forwarding traffic in standalone state and believe that the MUX is set to their side. Later when the CCP path comes back, the sender's CCP message is in conflict with the receiver's. There are a few ways to resolve the conflict:

Pick a rule. For example, the working CMTS always progresses to the teaching state; the protecting CMTS always progresses to the learning state and in the meantime force the MUX to the working CMTS side.
  An "Interface off" condition may be detected and explained to the CMTSs by DOCSIS. The receiving CMTS updates its state accordingly.
  Check MUX side. Each CMTS may verify the MUX side and correct its own state accordingly. This solution involves lower layer feedback.

Protecting CMTS Events

The protecting CMTS regularly receives SYNC messages in the standalone, teach and learn states. It receives SYNC_ACK messages in the teach state.

(A) Receive HELLO_ACK-from-any/HELLO_ACK-from-owner/HELLO_ACK-from-owner-forwarding/HELLO_ACK-from-owner-blocking When a protecting CMTS receives a HELLO_ACK message, it checks the IP address of the sender. If the sender matches the owner of the protecting CMTS's active member, the protecting CMTS is considered to be receiving a "HELLO_ACK-from-owner" message. Otherwise, the protecting CMTS is considered to be receiving a "HELLO_ACK-from-any" message. Furthermore, if a HELLO_ACK-from-owner message is received while the working CMTS is in the standalone or teach state, it is also called "HELLO_ACK-from-owner-forwarding"; if it is received from a working CMTS in the learn state, it is called "HELLO_ACK-from-owner-blocking."

(B) Missing HELLO_ACK/HELLO_ACK-from-owner/HELLO_ACK-from-any

If a protecting CMTS cannot receive a HELLO_ACK message from one working CMTS after n (configurable) retries, it is called "missing HELLO_ACK", and this working CMTS is considered potentially out of service. Furthermore, if this working CMTS is the owner of the protecting CMTS active member (the protecting CMTS is currently servicing the cable modems of this working CMTS), it is called "HELLO_ACK-from-owner", otherwise, "HELLO_ACK-from-any".

(C) Receive SWITCH_REQ-from-owner/SWITCH_REQ-from-any

When a protecting CMTS receives a SWITCH_REQ message, it checks the IP address of the sender. If the sender matches the owner of its protecting CMTS active member, the protecting CMTS is considered to be receiving a "SWITCH_REQ-from-owner message," otherwise, considered to be receiving a "SWITCH_REQ-from-any" message.

(D) Receive Failover Notice/failover-for-owner

A protecting CMTS may receive a failover notice from a third party. If this failover message is on behalf of the owner of the protecting CMTS's active member, it is further called a "failover-for-owner" message.

(E) Re-Sync entire database

This is not actually an event, but a special request. Given a scenario that no switchover occurs in a long period of time, a protecting CMTS may decide to re-synchronize its entire database with one working CMTS. It can stop sending HELLO for a while until the working CMTS times out the hold time. Then when HELLO resumes, the working CMTS should dump its entire database to the protecting CMTS.

Other Aspects of CCP

In a 1+n topology, a protecting CMTS and all working CMTSs maintain a CCP group with the same group ID. In a 1:1 scenario, each protection group is broken down into 2 independent CCP groups. CMTS1 maintains two groups: group1 as working CMTS and group2 as protecting CMTS; CMTS2 maintains two groups as well: group1 as protecting CMTS and group2 as working CMTS. Group members only talk with other CMTSs of the same group ID.

In a very specific embodiment, CCP runs on top of UDP at port 1971. Packets are sent to unicast IP addresses only. A CMTS status is preconfigured to be either working or protecting. A working CMTS asks for protection on FIFO order; no preemption is allowed. A CMTS can be in forwarding or blocking mode switchable during run-time. During initialization, a CMTS doesn't know it's forwarding or blocking so the state is set to init.

State Transition Diagrams

Figure 6:
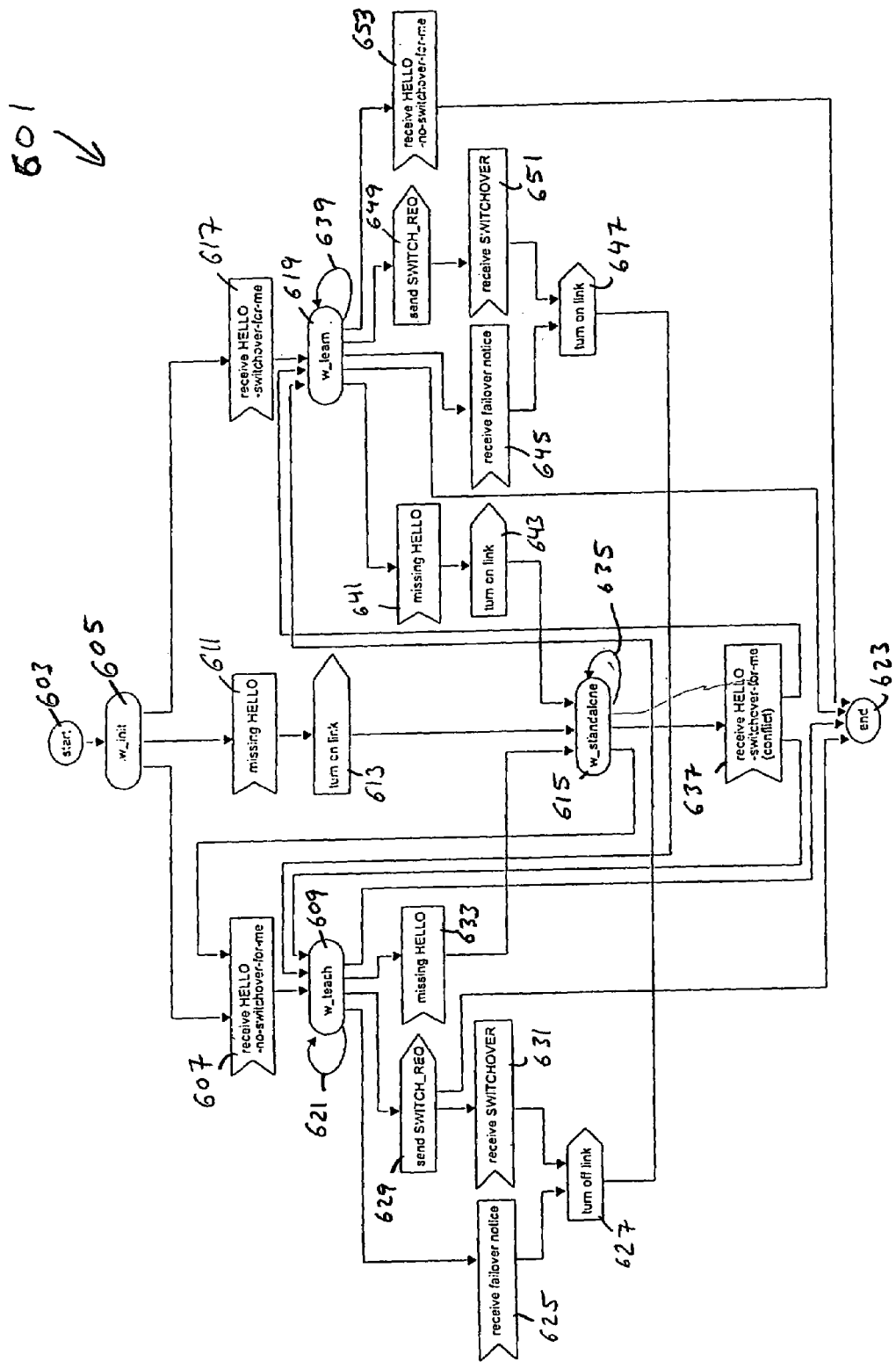
Figure 7:
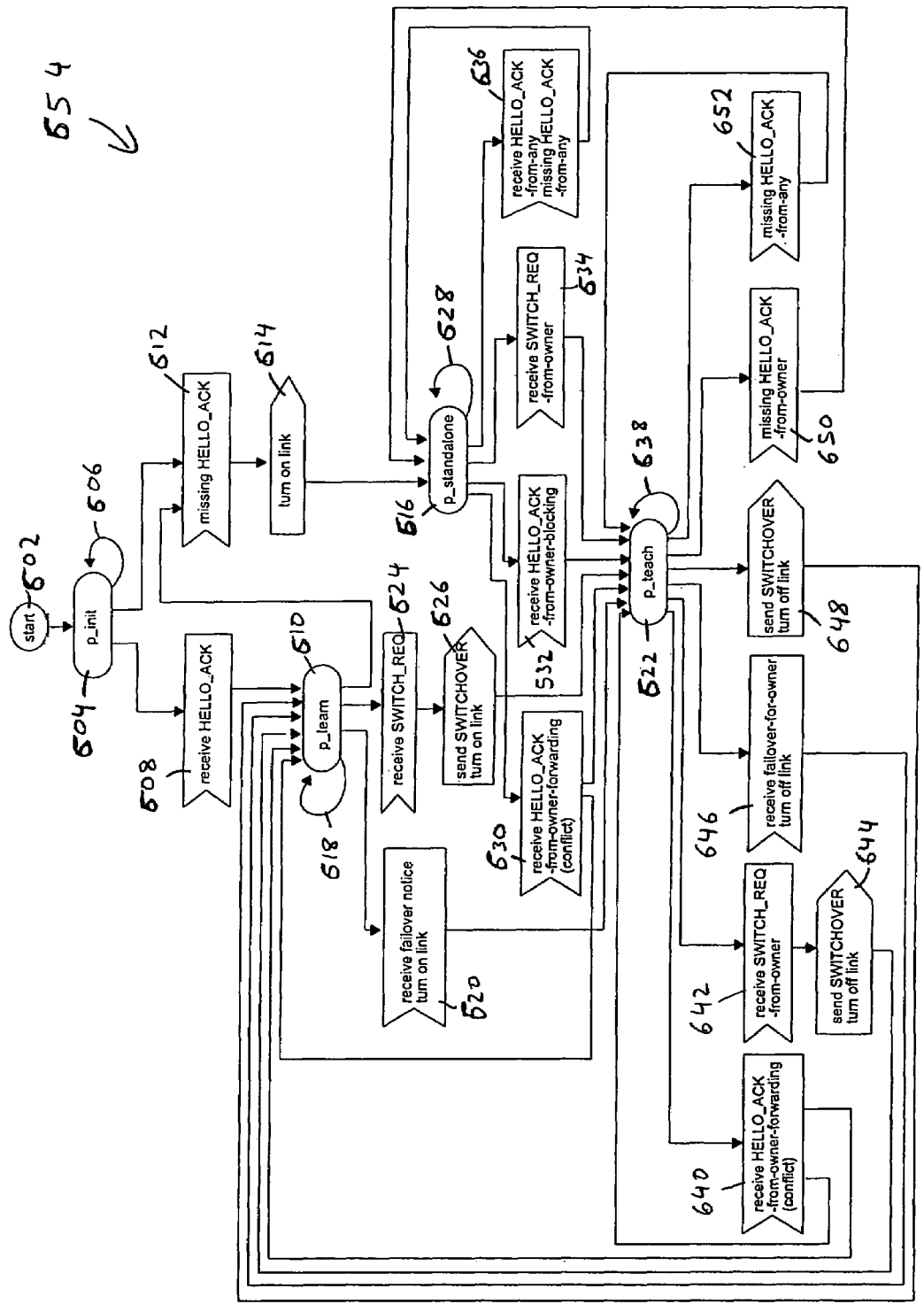

FIGS. 6 and 7 present state transition diagrams illustrating how the working and protection CMTS state machines operate in accordance with the specific CCP embodiment described here. Turning first to FIG. 6, the state machine transition diagram 601 depicts the operation of a working CMTS. The process begins at 603, at which point the working CMTS reboots or otherwise comes online. Initially, it enters the init state at 605. It remains in this sate until one of three events transpire.

First, it may receive a HELLO message, which does not identify it as the owner of the traffic channel. See 607. In this case, there is a protection CMTS present but it is not forwarding traffic on behalf of the working CMTS. To service its cable modems, the working CMTS should immediately enter the teach state as indicated at 609. It turns on its RF link at this point.

The second event of relevance to a working CMTS in the init state is the lack of receipt of a HELLO message within the designated hold time. See 611. Because HELLO messages are to be sent by protection CMTSs, the absence of a HELLO message indicates that a protection CMTS is likely unavailable. When a missing HELLO is detected at 611, the working CMTS turns on its RF link to the HFC (613) and transitions to a standalone state at 615.

The third event of relevance is receipt of a HELLO message having the working CMTS itself identified in the owner/ID portion of the message. See 617. This means that there is a protection CMTS and it is acting on behalf of the working CMTS. In this case, the working CMTS transitions from the init state to a learn state at 619.

At this point, after one of the three above-described events has transpired, the CMTS exists in one of three states: teach, standalone, or learn. While in the teach state, the working CMTS can experience five events of relevance. First, it may simply remain in the teach state, as indicated by a loop back arrow 621, because no other event has caused it to transition to a different state. Second, the CMTS may simply go offline without warning. This is indicated by the arrow pointing to the end of the process at 623.

The third event of relevance for a working CMTS in the teach state is receipt of a failover notice from a third party such as a detector cable modem on the HFC network. See 625. When such notice is received, the working CMTS turns off its RF link at 627 and transitions to the learn state at 619.

The next event of relevance for a working CMTS in the teach state 609 is sending a SWITCH_REQ message because it wishes to have the protection CMTS take over responsibility for its cable modems. See 629. At this point, there are two possibilities. First, the working CMTS may not have an opportunity to take further action and simply goes offline as indicated by the arrow to the end of the process at 623. Alternatively, the working CMTS may receive a SWITCHOVER message from the protection CMTS at 631. Thereafter, the working CMTS turns off its RF link at 627.

The final relevant event to a working CMTS in the teach state is detection of a missing HELLO message at 633. This indicates to the working CMTS that the protection CMTS is no longer available. Thus, the working CMTS transitions to the standalone state at 615.

While in the standalone state, the working CMTS may experience three relevant events. First, it simply continues servicing its cable modems because no other event has forced it to transition to a different state. This is indicated by an arrow 635.

The second event of relevance for a standalone working CMTS is receipt of a HELLO message in which the owner/ID field is not that of the working CMTS or the protection CMTS is in a learn state. This indicates that the protection CMTS is available to learn from the working CMTS. See 607. At that point, the working CMTS transitions from the standalone state to the teach state 609.

The third event of relevance to a standalone working CMTS is receipt of a HELLO message in which the owner/ID field matches the ID of the working CMTS (and the protection CMTS is in a standalone or teach state). This means that the protection CMTS on the network is currently attempting to service the cable modems for which the working CMTS is responsible. See 637. This represents a conflict state. Depending upon how the working CMTS is configured, it can take one of two actions. In one case, it can go directly to the teach state 609. In another configuration, it can go to the learn state 619.

While in learn state 619, the working CMTS can experience six events of relevance. First, and most simply, it remains in the learn state and communicates with protection CMTS as necessary. See arrow 639. The second relevant event for a working CMTS in learn state is simply going offline as depicted by the arrow to the end of process 623.

The next event of relevance is detection of a missing HELLO from the protection CMTS. See 641. When this is the case, the working CMTS turns on its RF link to the cable modems of the network at 643 and then enters the standalone state 615.

The next event of relevance to a working CMTS in the learn state is receipt of a failover notice from a third party such as a cable modem detector. See 645. At this point, the working CMTS turns on its RF link at 647 and transitions to teach state 609 in order to take over responsibility for its own cable modems. Note that the failover notice in this case indicates that the protection CMTS, which is acting on behalf of the working CMTS, is no longer able to provide service.

The next event to consider is sending a SWITCH_REQ message from the working CMTS in the learn state. See 649. After sending this message, the working CMTS may receive a SWITCHOVER message from the protection CMTS at 651. At that point, the working CMTS turns on its RF link at 647 and transitions to teach state 609. There may be various reasons why the CMTS in learn state wishes to transition to the teach state and take over responsibility for its cable modems. Typically, this is a matter of design optimization.

The final event of interest to a working CMTS in learn state is receipt of a HELLO message in which the owner/ID is not that of the working CMTS. See 653. In this event, the protecting CMTS is serving another working CMTS. So if the working CMTS at issue has to get rid of its traffic, the protecting CMTS cannot help it.

FIG. 7 illustrates a process 654 illustrating the state transitions and associated triggering events available to a protection CMTS in accordance with the specific CCP version described here. The process starts at 602 where the protection CMTS comes online. It then immediately assumes an init state 604. While in this state, it can experience three events of relevance. The first, and most trivial, is simply remaining in the init state because no event triggering a transition has occurred. This is represented by a loop back arrow 606.

As indicated above, while the protection CMTS is online, it should regularly send HELLO messages. In response, the working CMTS should send HELLO_ACK messages. As illustrated, a protection CMTS in the init state may receive a HELLO_ACK message. See 608. This indicates that a working CMTS is handling the cable modems. Thus, the protecting CMTS transitions to a learn state 610. Note that there may be no owner_id specified in a HELLO message because in the init state, the protecting CMTS is not forwarding traffic on behalf of any working CMTS.

The final event of relevance to a protecting CMTS in the init state is detection of a missing HELLO_ACK message at 612. This indicates that there is no working CMTS currently servicing the cable modems that the protecting CMTS is to provide backup for. Thus, at this point, the protecting CMTS turns on an RF link to those cable modems at 614. It then transitions to a standalone state at 616.

According to this process flow, a protecting CMTS coming online first enters an init state 606 and then quickly transitions to either a learn state 610 or a standalone state 616, depending upon whether it receives or does not receive a HELLO_ACK message.

Within the learn state 610, the protecting CMTS can experience four separate events of relevance. The first, and most trivial, is simply remaining in the learn state because no other event has triggered a transition. This is illustrated by the arrow 618.

The next event of relevance to the protection CMTS in learn state 610 is receipt of a failover notice from a third party. This is indicated at 620. This event triggers the protecting CMTS to turn on its RF link to allow communication with the cable modems in its protecting group. Thereafter, the protecting CMTS transitions to a teach state 622.

The next event of relevance to a protection CMTS in learn state 610 is receipt of a SWITCH_REQ message as indicated at 624. This indicates that the working CMTS is asking the protecting CMTS to take responsibility for its cable modems on the HFC network. After receiving the SWITCH_REQ message at 624, the protecting CMTS should send a SWITCHOVER message and turn on its RF link as illustrated at 626. From there, the protection CMTS can transition to the teach state 622.

The final event of relevance to a protecting CMTS in the learn state is detection of a missing HELLO_ACK message at 612. As discussed, this indicates that the working CMTS may no longer be servicing its cable modems. Thus, the protection CMTS turns on its RF link at 614 and begins servicing cable modems in the standalone state 616.

There are five events of relevance to a protection CMTS in the standalone state 616. The first and most trivial of these events is simply remaining in the standalone state because no other event forces a state transition. This is illustrated by the loop back arrow 628.

The next event of interest is receipt of a HELLO_ACK message from the owner CMTS, indicating that that CMTS is currently forwarding messages to its cable modems. See 630. This represents a conflict. The conflict can be resolved in one of two ways. First, the protection CMTS can transition to learn state 610, where it stays in synchronization with the working CMTS. Alternatively, the protection CMTS can enter teach state 622 and attempt to keep the working CMTS in synchronization.

The next event of relevance to a protection CMTS in the standalone state 616 is receipt of a HELLO_ACK message from the owner CMTS, but with that owner being in blocking mode. In other words, the owner is not currently forwarding messages to its cable modems. See 632. The only difference between the HELLO_ACK messages received at 630 and 632 is that in the case of 630, the HELLO_ACK message indicates that the owner CMTS is in the standalone or teach state. In the HELLO_ACK message of 632, the owner CMTS is in the learn state. There is no conflict, when the owner is in the learn state because the owner working CMTS is not currently forwarding messages to its cable modems. After receiving the HELLO_ACK message at 632, the protection CMTS transitions from the standalone state to the teach state 622.

The next relevant event for the protection CMTS in standalone state is receipt of a SWITCH_REQ message from its working CMTS (the owner). See 634. Thereafter, the protecting CMTS transitions from the standalone state 616 to the teach state 622. In this state, the protecting CMTS can synchronize the previously lost working CMTS. When the working CMTS database is synchronized, the protecting CMTS may then issue a SWITCHOVER message and perform a switch over.

The final relevant event for a protecting CMTS in standalone state 616 is receipt of a HELLO_ACK message from any working CMTS other than the one it is currently responsible for handling. See 636. Note that the protecting CMTS treats receipt of a HELLO_ACK message in its context the same as detecting a missing HELLO_ACK message. In both cases, the protecting CMTS simply remains in standalone state 616. Basically, event 636 indicates that a CMTS other than the working CMTS, that the protecting CMTS is now acting on behalf of, has responded with a HELLO_ACK MESSAGE. Because the protecting CMTS is currently servicing some other working CMTSs cable modems, it has no capacity to take on responsibility for cable modems of another working CMTS. Thus, a HELLO_ACK message from such other CMTS is not acted on as indicated in process 654. However, the protecting CMTS may record the missing HELLO_ACK for such other working CMTS and act to serve it when the protecting CMTS becomes available again.

Assuming now that the protecting CMTS has found its way to teach state 622, it can respond in one of seven ways. First and most trivially, the protection CMTS can simply remain in the teach state because no other event of significance has presented itself. This is indicated by loop back arrow 638.

Next, it is possible that the protection CMTS in teach state 622 receives a HELLO_ACK message from its owner CMTS and that HELLO_ACK message indicates that the owner CMTS is currently forwarding messages for its cable modems (because it is in either standalone or teach state). See 640. This situation again presents a conflict. And again, the protecting CMTS can respond in one of two ways, depending upon its configuration. It can either transition to learn state 610 where it keeps itself in synchronization with the working CMTS or it can remain in teach state 622 where it attempts to keep the working CMTS in synchronization with itself.

The next relevant event for the protecting CMTS in the teach state is receipt of a SWITCH_REQ message from its owner CMTS. See 642. Upon receipt of such message, the protection CMTS sends the obligatory SWITCHOVER message back to its owner CMTS and turns off its RF link to the relevant cable modems. See 644. The protecting CMTS then transitions from teach state 622 to learn state 610.

The next relevant event is receipt of a failover message as indicated at 646. This indicates to the protecting CMTS that a third-party entity has detected that it is not providing adequate service to the cable modems. Because the working CMTS is available (the protective CMTS is in teach state), the protecting CMTS can assume that the working CMTS will take over for it and provide better service. Thus, at 646, the protecting CMTS turns off its RF link to the cable modems and then transitions to learn state 610.

Next, the protecting CMTS in teach state 622 may determine that it will no longer be needed to service the relevant cable modems. In that case, it sends a SWITCHOVER message at 648 and turns off its RF link. It then transitions to learn state 610, assuming that it can remain online.

The next relevant event is detection of a missing HELLO_ACK message from the owner CMTS. See 650. This indicates that the owner working CMTS is no longer available to take over responsibility for its own group of cable modems. Thus, upon detection of such problem, the protection CMTS transitions from teach state 622 to standalone state 616.

Finally, the protecting CMTS in teach state 622 may detect a missing HELLO_ACK message from a CMTS other than the one it is currently providing backup service for. This is indicated at 652. Again, this situation arises most commonly in a 1+n topology in which the working CMTS is servicing two or more protection CMTSs. At the time that the protection CMTS is acting on behalf of one of the working CMTSs, it is unavailable to provide service for another working CMTS. Thus, receipt of or no receipt of a HELLO_ACK message from such other working CMTS is not a cause for action on the part of the protection CMTS. Thus, after the event depicted at 652, the protecting CMTS simply remains in teach state 622.

IV. CMTS Configurations

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces. One important class of device that may be used to implement the present invention is the cable modem termination system. Preferably, the CMTS is a "routing" CMTS, which handles at least some routing functions. Alternatively, the CMTS may be a "bridging" CMTS, which handles only lower-level tasks.

Figure 8:
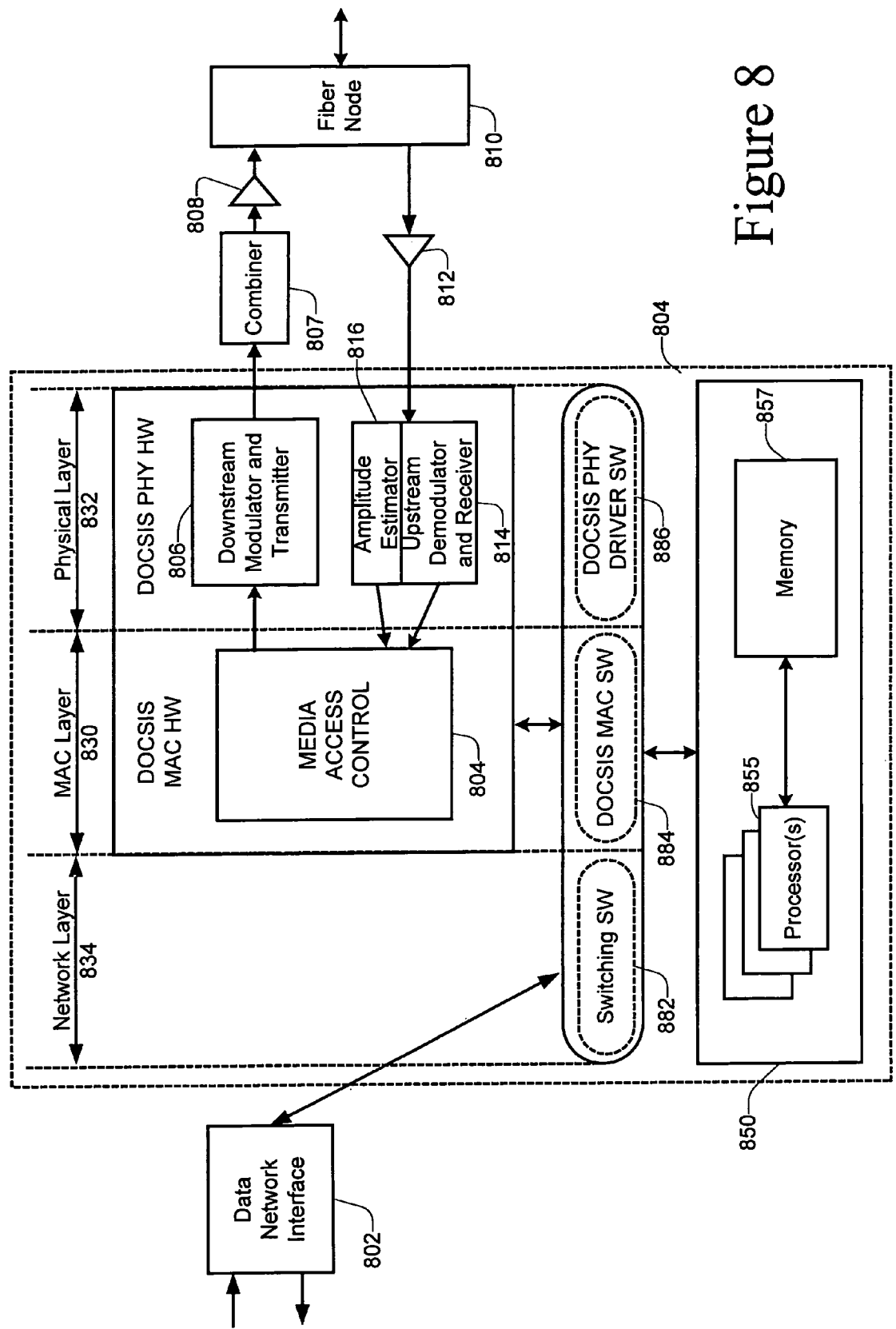

FIG. 8 provides an example of some components of a CMTS that may be used to implement certain aspects of this invention. In the specific embodiment as shown in FIG. 8, a CMTS 804 provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Upstream optical data signals (packets) arriving via an optical fiber node 810 are converted to electrical signals by a receiver 812. Next, the upstream information packet (RF electrical signals) is demodulated by the demodulator/receiver 814 and then passed to MAC layer block 830. A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. Note that at the time when this document was filed, the DOCSIS standard was described in the "Data-Over-Cable Service Interface Specifications—Radio Interface Specifications" SP-RFIv1.1-I02-990731, Interim Specification Jul. 31, 1999. That document is incorporated herein by reference for all purposes. The MAC headers include addresses to specific modems or to a hub (if sent upstream) by a MAC layer block 830 in CMTS 804. Note that the cable modems also include MAC addressing components. In the cable modems, these components encapsulate upstream data with a header containing the MAC address of the hub.

MAC layer block 830 includes a MAC hardware portion 804 and a MAC software portion 884, which together serve the above-described functions. In a preferred embodiment, MAC hardware portion 804 is distinct from the router's general-purpose microprocessor and is dedicated to performing some MAC layer functions.

After MAC layer block 830 has processed the upstream information, it is then passed to network layer block 834. Network layer block 834 includes switching software 882 for causing the upstream information packet to be switched to an appropriate data network interface on data network interface 802. When a packet is received at the data network interface 802 from an external source, the switching software within network layer 834 passes the packet to MAC layer 830. MAC block 804 then transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 807. An optical converter 808 converts the modulated RF electrical signals to optical signals that can be received and transmitted via Fiber Node 810 to the cable modem hub.

Note that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network. In a specific embodiment, the network layer of the CMTS is configured as a cable line card coupled to a standard router that includes the physical layer block 832 and MAC layer block 830. Using this type of configuration, the CMTS is able to send and/or receive IP packets to and from the data network interface 802 using switching software block 882.

The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8, CMTS 804 includes a central hardware block 850 including one or more processors 855 and memory 857. These hardware components interact with software and other hardware portions of the various layers within the CMTS. They provide general purpose computing power for much of the software. Memory 857 may include, for example, I/O memory (e.g. buffers), program memory, shared memory, etc. Hardware block 850 may physically reside with the other CMTS components. In one embodiment, the software entities 882, 884, and 886 are implemented as part of a network operating system running on hardware 850. Preferably, the synchronization and failover functions of this invention are implemented in software as part of the operating system. In FIG. 8, such software may be part of MAC layer software 884 and/or the switching software 882, or may be closely associated therewith. Of course, the synchronization and failover logic could reside in hardware, software, or some combination of the two.

The procedures employed by the working and protecting CMTSs during synchronization and failover are preferably performed at the MAC layer of the CMTS logic. Thus, in CMTS 804, most of the synchronization and failover operations would be performed by the hardware and software provided for MAC layer logic 830. Associated with the synchronization are a message protocol and updating the protective CMTS database to include the cable modems' parameters. To allow mac layer logic 830 to implement such procedures, the working CMTS may have to obtain modem parameters such as power readings (and sometimes frequency and signal to noise ratio readings) from an amplitude estimator 816 forming part of the physical layer logic 832.

The redundancy methods of this present invention may be implemented on various general purpose cable modem termination systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 8 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 857) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

V. Other Embodiments

Setting working and protection paths, as described above, has another application beyond merely providing redundancy. Typically installing new software on a cable network is very problematic, mainly because the types of bugs and how to remedy them are unknown ahead of time. Thus, there must a period of service time in which the network may experience significant problems associated with the new software's bugs. In fact, the network performance can be so poor, that the old software is reinstalled. By providing a protection path, the new software can be tested by some of the cable modems without disrupting service through the working path for most cable modems. Thus, the new software and its affects on the cable network can be characterized before it is used for actual service.

While the discussion to this point has focused on a redundancy technology for cable networks, the technology of the present invention may be applied to any shared-access network having a plurality of hosts or nodes which share at least one channel for communicating with at least one "head-end" in the network. Examples of shared-access networks include, in addition to cable networks, wireless networks, Ethernet, etc. In the cable network, the plurality of nodes represents a plurality of cable modems that communicate with at least one CMTS at the centralized termination system using at least one shared-access upstream and downstream channel.

In general, the methods and apparatus described above may be implemented on a protection device (e.g., a network headend device or a router) for providing redundancy in a network having (1) a working device (e.g., another network headend device or router) that provides normal service to a host and (2) the protection device which takes over service to the host should service from the working device fail. Such general methods may include the following sequence: (a) assuming a standby state in which the protection device can take over service of the host should its service with the active device fail; and (b) synchronizing the standby device with the active device. Generally, such methods (and associated apparatus) will be particularly valuable in the context of telephony service.

In the wireless system (e.g., represented by FIG. 9) the plurality of nodes or hosts corresponds to the plurality of wireless nodes 950 which use at least one shared access channel to communicate with at least one access control system 922 located at the head end of the wireless system.

Figure 9:
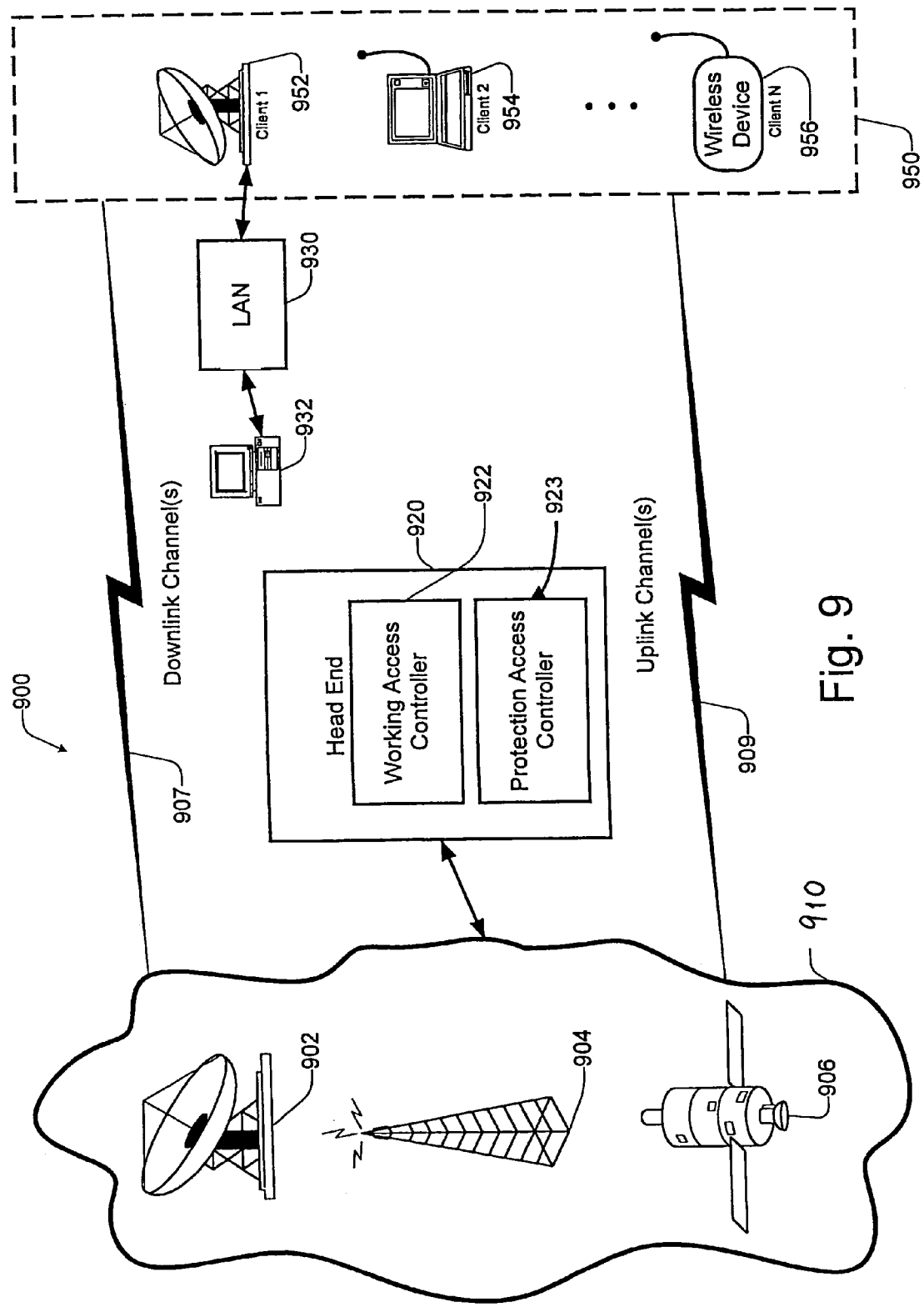

As shown in FIG. 9, the wireless system includes a central termination system (or head end) 920. The head end includes a working access controller or access control system (ACS) 922 which communicates with a plurality of wireless nodes 950, and coordinates access between each of the wireless nodes and the head end 920. The access controller 922 may include memory and at least one processor. In a specific embodiment, the function of the access controller 922 is analogous to that of the CMTS described above with respect to cable modem networks. It may serve as a router as well.

The head end 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the head end 920 of the wireless computer system communicates with the plurality of nodes 950 via one or more downlink channels 907 and one or more uplink channels 909. Each downlink channel 907 is a broadcast-type channel utilized by the head end to communicate with an associated group of wireless nodes within the wireless network. The uplink channel 909 is a shared-access channel, which is utilized by a group of wireless nodes (analogous to cable modems) to communicate with the head end 920.

The working access controller 922 stores network node parameters for the various nodes that it services. The access controller 922 may also store the IP addresses for nodes that it services while being backed up by a protection access controller 923. These IP addresses are also stored by protection access controller 922 to allow a smooth transition in service should working access controller 922 fail. In a specific embodiment of the present invention, the synchronization information is similar to that of the cable network CMTSs described above.

The wireless devices or nodes 950 may include any one of a number of wireless transmitting/receiving devices. For example, a satellite dish 952 may be used to communicate with the head end 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the head end via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described redundancy methods may easily be implemented in wireless system 900 using the detailed description of the present invention provided herein. Moreover, the technique of the present invention may be easily implemented in any computer network which uses shared access channels for communicating between a centralized computing system and one or more remote nodes.

Although the foregoing invention has been described in some detail for purposes of clarity of understanding, it will be apparent that certain changes and modifications may be practiced within the scope of the appended claims. For example, while ranging was described above, other techniques for causing modems to transmit signals at predefined frequencies and amplitudes may be employed.

What is claimed is:

1. A method of providing backup service to a group of cable modems on a cable network having a working CMTS providing service to the group of cable modems and having a protecting CMTS available to take over service to the group of cable modems, the method comprising:
   receiving information about the status of the group of cable modems from the working CMTS to thereby synchronize the protecting CMTS to the working CMTS in response to a change in configuration data pertaining to the group of cable modems associated with the working CMTS;
   determining that the protecting CMTS is to take over service to the group of cable modems; and
   taking over service to the group of cable modems.

2. The method of claim 1, wherein receiving information involves receiving a synchronization message from the working CMTS.

3. The method of claim 2, wherein the synchronization message includes MAC and IP addresses of the cable modems in the group of cable modems.

4. The method of claim 2, wherein the synchronization message includes DOCSIS parameters for the cable modems of the group of cable modems.

5. The method of claim 1, further comprising updating a database of the protecting CMTS with the received information.

6. The method of claim 1, further comprising: prior to receiving information about the status of the group of cable modems, becoming available to take over service from the working CMTS, wherein the information about the status of the group of cable modems includes an entire set of synchronization data for the group of cable modems from the working CMTS.

7. The method of claim 1, further comprising providing service to a second group of cable modems from the protecting CMTS.

8. The method of claim 1, wherein the protecting CMTS does not provide service to a second group of cable modems.

9. The method of claim 1, wherein determining that the protecting CMTS is to take over service to the group of cable modems comprises determining that the working CMTS is not responding to the protecting CMTS or is not providing signals to a designated node on the cable network.

10. The method of claim 1, wherein determining that the protecting CMTS is to take over service to the group of cable modems comprises receiving notification from a network node that a downstream signal from the working CMTS is no longer being received.

11. The method of claim 1, wherein the working CMTS and protecting CMTS are separate CMTS interfaces provided on at least one CMTS chassis.

12. The method of claim 1, wherein service to the group of cable modems is switched from the working CMTS to the protecting CMTS without requiring that the group of cable modems to change their settings.

13. The method of claim 1, further comprising sending synchronization information, regarding the group of cable modems, to the working CMTS after the protecting CMTS takes over service to the group of cable modems.

14. The computer program product of claim 1, further comprising instructions for sending synchronization information, regarding the group of cable modems, to the working CMTS after the protecting CMTS takes over service to the group of cable modems.

15. A method of providing backup service to a group of cable modems on a cable network having a working CMTS providing service to the group of cable modems and having a protecting CMTS available to take over service to the group of cable modems, the method comprising:
   receiving information about the status of the group of cable modems from the working CMTS to thereby synchronize the protecting CMTS to the working CMTS;
   determining that the protecting CMTS is to take over service to the group of cable modems; and
   taking over service to the group of cable modems,
   wherein receiving information about the status of the group of cable modems comprises receiving a portion of synchronization data for the group of cable modems, and wherein the portion of synchronization data comprises data that has changed since a previous synchronization.

16. A method of providing backup service to a group of cable modems on a cable network having a working CMTS providing service to the group of cable modems and having a protecting CMTS available to take over service to the group of cable modems, the method comprising:
receiving information about the status of the group of cable modems from the working CMTS to thereby synchronize the protecting CMTS to the working CMTS;
determining that the protecting CMTS is to take over service to the group of cable modems; and
taking over service to the group of cable modems,
wherein the protecting CMTS provides downstream messages to the group of cable modems on the same downstream channel as used by the working CMTS to provide service to the group of cable modems.

17. A method of providing backup service to a group of cable modems on a cable network having a working CMTS providing service to the group of cable modems and having a protecting CMTS available to take over service to the group of cable modems, the method comprising:
receiving information about the status of the group of cable modems from the working CMTS to thereby synchronize the protecting CMTS to the working CMTS;
determining that the protecting CMTS is to take over service to the group of cable modems; and
taking over service to the group of cable modems,
wherein determining that the protecting CMTS is to take over service to the group of cable modems comprises determining that the working CMTS is not responding to the protecting CMTS or is not providing signals to a designated node on the cable network, and
wherein determining that the working CMTS is not responding comprises receiving no acknowledgement of a HELLO message within a predefined time after the HELLO message was sent from the protecting CMTS to the working CMTS.

18. A method of providing backup service to a group of cable modems on a cable network having a working CMTS providing service to the group of cable modems and having a protecting CMTS available to take over service to the group of cable modems, the method comprising:
receiving information about the status of the group of cable modems from the working CMTS to thereby synchronize the protecting CMTS to the working CMTS;
determining that the protecting CMTS is to take over service to the group of cable modems; and
taking over service to the group of cable modems,
wherein determining that the protecting CMTS is to take over service to the group of cable modems comprises receiving notification from a network node that a downstream signal from the working CMTS is no longer being received, and
wherein the network node is a cable modem or an upconverter.

19. CMTS apparatus capable of acting as a protecting CMTS on a cable network having a group of cable modems to be serviced by a working CMTS, such that when the working CMTS becomes unavailable, the protecting CMTS can take over service to the group of modems, the CMTS apparatus comprising:
one or more processors; and
a memory,
wherein at least one of the processors and the memory are configured or designed to receive and store synchronization data from the working CMTS in response to a change in configuration data pertaining to the group of cable modems associated with the working CMTS, the synchronization data specifying information about the group of cable modems.

20. The CMTS apparatus of claim 19, wherein the CMTS apparatus is a complete CMTS or a portion of a CMTS.

21. The CMTS apparatus of claim 20, wherein the CMTS apparatus is a line card.

22. CMTS apparatus capable of acting as a protecting CMTS on a cable network having a group of cable modems to be serviced by a working CMTS, such that when the working CMTS becomes unavailable, the protecting CMTS can take over service to the group of modems, the CMTS apparatus comprising:
one or more processors; and
a memory,
wherein at least one of the processors and the memory are configured or designed to receive and store synchronization data from the working CMTS, the synchronization data specifying information about the group of cable modems, and
wherein at least one of the processors and the memory are configured or designed to periodically send HELLO messages to the working CMTS to confirm that the working CMTS is operating.

23. The CMTS apparatus of claim 19, wherein at least one of the processors and the memory are configured or designed to take over responsibility for service to the group of cable modems upon determining that the working CMTS is or will become unavailable to service the group of cable modems.

24. The CMTS apparatus of claim 19, wherein at least one of the processors and the memory are configured or designed to receive the synchronization data in the form of a synchronization message specifying at least one of addresses and operating statuses of one or more of the cable modems in the group of cable modems.

25. CMTS apparatus capable of acting as a protecting CMTS on a cable network having a group of cable modems to be serviced by a working CMTS, such that when the working CMTS becomes unavailable, the protecting CMTS can take over service to the group of modems, the CMTS apparatus comprising:
one or more processors; and
a memory,
wherein at least one of the processors and the memory are configured or designed to receive and store synchronization data from the working CMTS, the synchronization data specifying information about the group of cable modems, and
wherein at least one of the processors and the memory are configured or designed to service the group of cable modems using a downstream frequency that is identical to a downstream frequency used by the working CMTS.

26. A computer program product comprising a machine readable medium on which is provided instructions for providing backup service to a group of cable modems on a cable network having a working CMTS providing service to the group of cable modems and having a protecting CMTS available to take over service to the group of cable modems, the instructions comprising:

receiving information about the status of the group of cable modems from the working CMTS to thereby synchronize the protecting CMTS to the working CMTS in response to a change in configuration data pertaining to the group of cable modems associated with the working CMTS;

determining that the protecting CMTS is to take over service to the group of cable modems; and taking over service to the group of cable modems.

27. The computer program product of claim 26, wherein the instruction for receiving information involves receiving a synchronization message from the working CMTS.

28. The computer program product of claim 26, further comprising instructions for updating a database of the protecting CMTS with the received information.

29. The computer program product of claim 26, further comprising the following instructions: prior to receiving information about the status of the group of cable modems, becoming available to take over service from the working CMTS, wherein the information about the status of the group of cable modems includes an entire set of synchronization data for the group of cable modems from the working CMTS.

30. The computer program product of claim 26, further comprising instructions for providing service to a second group of cable modems from the protecting CMTS.

31. The computer program product of claim 26, wherein the instructions for determining that the protecting CMTS is to take over service to the group of cable modems comprises instructions for determining that the working CMTS is not responding to the protecting CMTS or is not providing signals to a network node on the cable network.

32. A computer program product comprising a machine readable medium on which is provided instructions for providing backup service to a group of cable modems on a cable network having a working CMTS providing service to the group of cable modems and having a protecting CMTS available to take over service to the group of cable modems, the instructions comprising:

receiving information about the status of the group of cable modems from the working CMTS to thereby synchronize the protecting CMTS to the working CMTS;

determining that the protecting CMTS is to take over service to the group of cable modems; and taking over service to the group of cable modems, wherein the instructions provide that the protecting CMTS provides downstream messages to the group of cable modems on the same downstream channel as used by the working CMTS to provide service to the group of cable modems.

33. A computer program product comprising a machine readable medium on which is provided instructions for providing backup service to a group of cable modems on a cable network having a working CMTS providing service to the group of cable modems and having a protecting CMTS available to take over service to the group of cable modems, the instructions comprising:

receiving information about the status of the group of cable modems from the working CMTS to thereby synchronize the protecting CMTS to the working CMTS;

determining that the protecting CMTS is to take over service to the group of cable modems; and take over service to the group of cable modems, wherein the instructions for determining that the protecting CMTS is to take over service to the group of cable modems comprises instructions for determining that the working CMTS is not responding to the protecting CMTS or is not providing signals to a network node on the cable network, and wherein the network node is a cable modem or an upconverter.

34. CMTS apparatus capable of acting as a working CMTS on a cable network having a group of cable modems to be serviced by the working CMTS, such that when the working CMTS becomes unavailable, a protecting CMTS can take over service to the group of cable modems, the CMTS apparatus comprising:

one or more processors; and a memory, wherein at least one of the processors and the memory are configured or designed to send synchronization data to the protecting CMTS in response to a change in configuration data pertaining to the group of cable modems associated with the working CMTS, the synchronization data specifying information about the group of cable modems.

35. The CMTS apparatus of claim 34, wherein the CMTS apparatus is a complete CMTS or a portion of a CMTS.

36. The CMTS apparatus of claim 34, wherein at least one of the processors and the memory are configured to send the synchronization data in the form of a synchronization message specifying at least one of addresses and operating statuses of one or more of the cable modems in the group of cable modems.

37. The CMTS apparatus of claim 34, wherein at least one of the processors and the memory are configured or designed to send a SWITCH_REQ message indicating that the working CMTS wishes to have the protecting CMTS take over service to the group of cable modems.

38. CMTS apparatus capable of acting as a working CMTS on a cable network having a group of cable modems to be serviced by the working CMTS, such that when the working CMTS becomes unavailable, a protecting CMTS can take over service to the group of cable modems, the CMTS apparatus comprising:

one or more processors; and a memory, wherein at least one of the processor and the memory are configured or designed to send synchronization data to the protecting CMTS, the synchronization data specifying information about the group of cable modems, and wherein at least one of the processors and the memory are configured or designed to send HELLO acknowledge messages to the protecting CMTS upon receipt of a HELLO message from the protecting CMTS.

39. A method of providing working service to a group of cable modems on a cable network having a working CMTS providing service to the group of cable modems and having a protecting CMTS available to take over service to the group of cable modems, the method comprising:

sending synchronization data about the group of modems to the protecting CMTS in response to a change in configuration data pertaining to the group of cable modems associated with the working CMTS;

determining that the protecting CMTS should take over service to the group of cable modems;

notifying the protecting CMTS that it should take over service to the group of cable modems; and discontinuing service to the group of cable modems.

40. The method of claim 39, wherein sending the synchronization data comprises sending a synchronization message containing the synchronization data.

41. The method of claim 40, wherein the synchronization message includes MAC and IP addresses of the cable modems in the group of cable modems.

42. The method of claim 40, wherein the synchronization message includes DOCSIS parameters for the cable modems of the group of cable modems.

43. The method of claim 39, further comprising determining that the protecting CMTS has become available to provide service to the group of cable modems, and wherein sending the synchronization data comprises sending information pertaining to all current parameters of the group of cable modems in order to allow the protecting CMTS to provide service to the group of cable modems.

44. The method of claim 39, wherein determining that the protecting CMTS should take over service to the group of cable modems comprises receiving notification from a network node that a downstream signal from the working CMTS is no longer being received.

45. The method of claim 39, wherein notifying the protecting CMTS comprises sending a switch request message to the protecting CMTS.

46. The method of claim 39, wherein the working CMTS and protecting CMTS are separate CMTS interfaces provided on at least one CMTS chassis.

47. The method of claim 39, wherein service to the group of cable modems is switched from the working CMTS to the protecting CMTS without requiring that the group of cable modems to change their settings.

48. The method of claim 39, further comprising receiving synchronization information, regarding the group of cable modems, from the protecting CMTS after discontinuing service to the group of cable modems.

49. A method of providing working service to a group of cable modems on a cable network having a working CMTS providing service to the group of cable modems and having a protecting CMTS available to take over service to the group of cable modems, the method comprising:
  sending synchronization data about the group of modems to the protecting CMTS;
  determining that the protecting CMTS should take over service to the group of cable modems;
  notifying the protecting CMTS that it should take over service to the group of cable modems;
  discontinuing service to the group of cable modems; and
  determining that a parameter pertaining to at least one of the cable modems in the group of cable modems has changed, and wherein sending the synchronization data comprises sending information pertaining to the changed parameter to the protecting CMTS in order to allow the protecting CMTS to provide service to the group of cable modems.

50. A method of providing working service to a group of cable modems on a cable network having a working CMTS providing service to the group of cable modems and having a protecting CMTS available to take over service to the group of cable modems, the method comprising:
  sending synchronization data about the group of modems to the protecting CMTS;
  determining that the protecting CMTS should take over service to the group of cable modems;
  notifying the protecting CMTS that it should take over service to the group of cable modems; and
  discontinuing service to the group of cable modems;
  wherein determining that the protecting CMTS should take over service to the group of cable modems comprises receiving notification from a network node that a downstream signal from the working CMTS is no longer being received, and
  wherein the network node is a cable modem or an upconverter.

51. A computer program product comprising a machine readable medium on which is provided instructions for providing working service to a group of cable modems on a cable network having a working CMTS providing service to the group of cable modems and having a protecting CMTS available to take over service to the group of cable modems, the instructions comprising:
  sending synchronization data about the group of modems to the protecting CMTS in response to a change in configuration data pertaining to the group of cable modems associated with the working CMTS;
  determining that the protecting CMTS should take over service to the group of cable modems;
  notifying the protecting CMTS that it should take over service to the group of cable modems; and
  discontinuing service to the group of cable modems.

52. The computer program product of claim 51, wherein the instructions for sending the synchronization data comprises sending a synchronization message containing the synchronization data.

53. The computer program product of claim 51, further comprising instructions for determining that the protecting CMTS has become available to provide service to the group of cable modems, and wherein the instructions for sending the synchronization data comprises instructions for sending information pertaining to all current parameters of the group of cable modems in order to allow the protecting CMTS to provide service to the group of cable modems.

54. The computer program product of claim 51, wherein the instructions for determining that the protecting CMTS should take over service to the group of cable modems comprises instructions for receiving notification from a network node that a downstream signal from the working CMTS is no longer being received.

55. The computer program product of claim 51, wherein instructions for notifying the protecting CMTS comprises instructions for sending a switch request message to the protecting CMTS.

56. The computer program product of claim 51, further comprising instructions for receiving synchronization information, regarding the group of cable modems, from the protecting CMTS after discontinuing service to the group of cable modems.

57. A computer program product comprising a machine readable medium on which is provided instructions for providing working service to a group of cable modems on a cable network having a working CMTS providing service to the group of cable modems and having a protecting CMTS available to take over service to the group of cable modems, the instructions comprising:
  sending synchronization data about the group of modems to the protecting CMTS;

determining that the protecting CMTS should take over service to the group of cable modems;

notifying the protecting CMTS that it should take over service to the group of cable modems;

discontinuing service to the group of cable modems; and instructions for determining that a parameter pertaining to at least one of the cable modems in the group of cable modems has changed, and wherein the instructions for sending the synchronization data comprises instructions for sending information pertaining to the changed parameter to the protecting CMTS in order to allow the protecting CMTS to provide service to the group of cable modems.

58. A method of providing backup service to a group of network nodes on a network having a working headend device providing service to the group of network nodes and having a protecting headend device available to take over service to the group of network nodes, the method comprising:

receiving information about the status of the group of network nodes from the working headend device to thereby synchronize the protecting headend device to the working headend device in response to a change in configuration data pertaining to the group of cable modems associated with the working headend device;

determining that the protecting headend device is to take over service to the group of network nodes; and taking over service to the group of network nodes.

59. The method of claim 58, wherein the network is a wireless network.

* * * * *